US011930350B2

(12) United States Patent
Laaksonen et al.

(10) Patent No.: US 11,930,350 B2
(45) Date of Patent: Mar. 12, 2024

(54) RENDERING AUDIO

(71) Applicant: Nokia Technologies Oy, Espoo (FI)

(72) Inventors: Lasse Laaksonen, Tampere (FI); Arto Lehtiniemi, Lempäälä (FI); Sujeet Shyamsundar Mate, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 17/782,703

(22) PCT Filed: Dec. 7, 2020

(86) PCT No.: PCT/EP2020/084789
§ 371 (c)(1),
(2) Date: Jun. 6, 2022

(87) PCT Pub. No.: WO2021/122076
PCT Pub. Date: Jun. 24, 2021

(65) Prior Publication Data

US 2023/0028238 A1 Jan. 26, 2023

(30) Foreign Application Priority Data

Dec. 18, 2019 (GB) ..................................... 1918701

(51) Int. Cl.
*H04S 7/00* (2006.01)
*H04S 3/00* (2006.01)

(52) U.S. Cl.
CPC ................ *H04S 7/30* (2013.01); *H04S 3/004* (2013.01); *H04S 2420/11* (2013.01)

(58) Field of Classification Search
CPC ... H04S 7/30; H04S 7/40; H04S 3/004; H04S 2420/11
USPC ........................ 381/12, 56, 80, 81, 123, 124
See application file for complete search history.

(56) References Cited

U.S. PATENT DOCUMENTS

| | | | | |
|---|---|---|---|---|
| 10,602,300 | B1 * | 3/2020 | Lyren | H04S 7/304 |
| 2005/0149639 | A1 * | 7/2005 | Vrielink | G08C 23/04 710/8 |
| 2012/0041579 | A1 * | 2/2012 | Davis | H04R 1/403 700/94 |

(Continued)

FOREIGN PATENT DOCUMENTS

| | | | |
|---|---|---|---|
| WO | 2009/097009 | A1 | 8/2009 |
| WO | 2017/117293 | A1 | 7/2017 |

OTHER PUBLICATIONS

Search Report received for corresponding United Kingdom Patent Application No. 1918701.2, dated Jun. 2, 2020, 4 pages.

(Continued)

*Primary Examiner* — William A Jerez Lora
(74) *Attorney, Agent, or Firm* — Nokia Technologies Oy

(57) ABSTRACT

An apparatus, method and computer program is described comprising: providing an incoming audio indication in response to incoming audio (41), the incoming audio indication comprising visual representations of a plurality of audio modes (55-58); receiving at least one input from a user (59) for selecting one of the plurality of audio modes (42); and rendering audio (43) based, at least partially, on the selected audio mode, wherein one or more parameters of the rendered audio are determined based on the selected audio mode.

20 Claims, 12 Drawing Sheets

(56) References Cited

U.S. PATENT DOCUMENTS

| | | | | |
|---|---|---|---|---|
| 2012/0105603 | A1* | 5/2012 | Liu | H04S 7/302<br>348/51 |
| 2012/0259643 | A1* | 10/2012 | Engdegard | G10L 19/008<br>704/500 |
| 2014/0192986 | A1* | 7/2014 | Lee | H04R 3/12<br>381/1 |
| 2016/0320847 | A1* | 11/2016 | Coleman | H04S 7/304 |
| 2017/0331952 | A1 | 11/2017 | Rogers et al. | |
| 2017/0347219 | A1 | 11/2017 | McCauley et al. | |
| 2019/0297442 | A1 | 9/2019 | Lyren et al. | |
| 2022/0019403 | A1* | 1/2022 | Carrigan | H04R 29/001 |

OTHER PUBLICATIONS

Invitation to Pay Additional Fees received for corresponding Patent Cooperation Treaty Application No. PCT/EP2020/084789, dated Feb. 10, 2021, 10 pages.

International Search Report and Written Opinion received for corresponding Patent Cooperation Treaty Application No. PCT/EP2020/084789, dated Apr. 7, 2021, 17 pages.

* cited by examiner

RENDERING AUDIO

RELATED APPLICATION

This application claims priority to PCT Application No. PCT/EP20201084789, filed on Dec. 7, 2020, which claims priority to GB Application No. 1918701.2, filed on Dec. 18, 2019, each of which is incorporated herein by reference in its entirety.

FIELD

The present specification relates to rendering audio.

BACKGROUND

Rendering immersive audio may present a number of challenges. There remains a need for further improvements in this field.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

In a first aspect, this specification provides an apparatus comprising means for performing: providing an incoming audio indication in response to incoming audio, the incoming audio indication comprising one or more representations of a plurality of audio modes; receiving at least one input from a user for selecting one of the plurality of audio modes; and rendering audio based, at least partially, on the selected audio mode, wherein one or more parameters of the rendered audio are determined based on the selected audio mode.

In some examples, the one or more representations comprise one or more visual representations.

In some examples, the rendered audio comprises an audio preview of the selected audio mode.

In some examples, the incoming audio comprises one or more audio components; and the rendered audio comprises one or more of the audio components of the incoming audio, wherein the one or more audio components of the rendered audio are dependent, at least in part, on the selected audio mode.

In some examples, the apparatus further comprises means for performing: determining whether one or more audio components of the incoming audio are active or inactive; and in the event that one or more audio components of the incoming audio related to the selected audio mode are inactive, using one or more components of obtained local audio data for rendering the audio, wherein the one or more components of obtained local audio data correspond to the one or more inactive audio components.

In some examples, the means are further configured to perform: obtaining local audio data corresponding to at least one of the plurality of audio modes.

In some examples, the incoming audio relates to an incoming call.

In some examples, the rendered audio comprises incoming audio related to the incoming call in the event that the incoming call is answered; and the rendered audio comprises the local audio data in the event that the incoming call is not answered.

In some examples, the audio modes comprise at least some of a mono mode, a stereo mode, a spatial mode, and a spatial object mode.

In some examples, the one or more representations of the plurality of audio modes is dependent on an availability of one or more of said audio modes.

In some examples, the availability of one or more audio modes is dependent on one or more of: preferences of a transmitting user of the incoming audio; network capabilities of a transmitter of the incoming audio; network capabilities of the receiver of the incoming audio; and/or a level of audio present in the incoming audio.

In some examples, the means are further configured to perform: providing a spatial scene indicator, wherein the spatial scene indicator is dependent on the selected audio mode. The means may further be configured to perform: receiving a repositioning input via the spatial scene indicator, wherein the repositioning input allows repositioning of one or more elements of the incoming audio.

The means may comprise: at least one processor; and at least one memory including computer program code, the at least one memory and the computer program configured, with the at least one processor, to cause the performance of the apparatus.

In a second aspect, this specification describes a method comprising: providing an incoming audio indication in response to incoming audio, the incoming audio indication comprising one or more representations of a plurality of audio modes; receiving at least one input from a user for selecting one of the plurality of audio modes; and rendering audio based, at least partially, on the selected audio mode, wherein one or more parameters of the rendered audio are determined based on the selected audio mode.

In some examples, the one or more representations comprise one or more visual representations.

In some examples, the rendered audio comprises an audio preview of the selected audio mode.

In some examples, the incoming audio comprises one or more audio components; and the rendered audio comprises one or more of the audio components of the incoming audio, wherein the one or more audio components of the rendered audio are dependent, at least in part, on the selected audio mode.

Some examples may further comprise: determining whether one or more audio components of the incoming audio are active or inactive; and in the event that one or more audio components of the incoming audio related to the selected audio mode are inactive, using one or more components of obtained local audio data for rendering the audio, wherein the one or more components of obtained local audio data correspond to the one or more inactive audio components.

Some examples may further comprise: obtaining local audio data corresponding to at least one of the plurality of audio modes.

In some examples, the incoming audio relates to an incoming call.

In some examples, the rendered audio comprises incoming audio related to the incoming call in the event that the incoming call is answered; and the rendered audio comprises the local audio data in the event that the incoming call is not answered.

In some examples, the audio modes comprise at least some of a mono mode, a stereo mode, a spatial mode, and a spatial object mode.

In some examples, the one or more representations of the plurality of audio modes is dependent on an availability of one or more of said audio modes.

In some examples, the availability of one or more audio modes is dependent on one or more of: preferences of a transmitting user of the incoming audio; network capabilities of a transmitter of the incoming audio; network capabilities of the receiver of the incoming audio; and/or a level of audio present in the incoming audio.

Some examples may further comprise: providing a spatial scene indicator, wherein the spatial scene indicator is dependent on the selected audio mode. The method may further comprise: receiving a repositioning input via the spatial scene indicator, wherein the repositioning input allows repositioning of one or more elements of the incoming audio.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: providing an incoming audio indication in response to incoming audio, the incoming audio indication comprising one or more representations of a plurality of audio modes; receiving at least one input from a user for selecting one of the plurality of audio modes; and rendering audio based, at least partially, on the selected audio mode, wherein one or more parameters of the rendered audio are determined based on the selected audio mode.

In a sixth aspect, this specification describes a computer-readable medium (such as a non-transitory computer-readable medium) comprising program instructions stored thereon for performing at least the following: providing an incoming audio indication in response to incoming audio, the incoming audio indication comprising one or more representations of a plurality of audio modes; receiving at least one input from a user for selecting one of the plurality of audio modes; and rendering audio based, at least partially, on the selected audio mode, wherein one or more parameters of the rendered audio are determined based on the selected audio mode.

In a seventh aspect, this specification describes an apparatus comprising: at least one processor; and at least one memory including computer program code which, when executed by the at least one processor, causes the apparatus to: provide an incoming audio indication in response to incoming audio, the incoming audio indication comprising one or more representations of a plurality of audio modes; receive at least one input from a user for selecting one of the plurality of audio modes; and render audio based, at least partially, on the selected audio mode, wherein one or more parameters of the rendered audio are determined based on the selected audio mode.

In an eighth aspect, this specification describes an apparatus comprising: a first module configured to provide an incoming audio indication in response to incoming audio, the incoming audio indication comprising one or more representations of a plurality of audio modes; a second module configured to receive at least one input from a user for selecting one of the plurality of audio modes; and a third module configured to render audio based, at least partially, on the selected audio mode, wherein one or more parameters of the rendered audio are determined based on the selected audio mode.

In a ninth aspect, this specification describes an apparatus comprising means for performing: providing an outgoing audio indication comprising one or more representations of a plurality of audio modes; receiving at least one input from a user for selecting at least one of the plurality of audio modes; transmitting audio data based, at least partially, on the selected audio mode, wherein one or more parameters of the transmitted audio are determined based on the selected at least one of the plurality of audio modes.

In a tenth aspect, this specification describes a method comprising: providing an outgoing audio indication comprising one or more representations of a plurality of audio modes; receiving at least one input from a user for selecting at least one of the plurality of audio modes; transmitting audio data based, at least partially, on the selected audio mode, wherein one or more parameters of the transmitted audio are determined based on the selected at least one of the plurality of audio modes.

In an eleventh aspect, this specification describes an apparatus configured to perform any method as described with reference to the tenth aspect.

In a twelfth aspect, this specification describes computer-readable instructions which, when executed by computing apparatus, cause the computing apparatus to perform any method as described with reference to the tenth aspect.

In a thirteenth aspect, this specification describes a computer program comprising instructions for causing an apparatus to perform at least the following: providing an outgoing audio indication comprising one or more representations of a plurality of audio modes; receiving at least one input from a user for selecting at least one of the plurality of audio modes; transmitting audio data based, at least partially, on the selected audio mode, wherein one or more parameters of the transmitted audio are determined based on the selected at least one of the plurality of audio modes.

In a fourteenth aspect, this specification describes a computer-readable medium (such as a non-transitory computer-readable medium) comprising program instructions stored thereon for performing at least the following: providing an outgoing audio indication comprising one or more representations of a plurality of audio modes; receiving at least one input from a user for selecting at least one of the plurality of audio modes; transmitting audio data based, at least partially, on the selected audio mode, wherein one or more parameters of the transmitted audio are determined based on the selected at least one of the plurality of audio modes.

In a fifteenth aspect, this specification describes an apparatus comprising: at least one processor; and at least one memory including computer program code which, when executed by the at least one processor, causes the apparatus to: provide an outgoing audio indication comprising one or more representations of a plurality of audio modes; receive at least one input from a user for selecting at least one of the plurality of audio modes; and transmit audio data based, at least partially, on the selected audio mode, wherein one or more parameters of the transmitted audio are determined based on the selected at least one of the plurality of audio modes.

In a sixteenth aspect, this specification describes an apparatus comprising: a first module configured to provide an outgoing audio indication comprising one or more representations of a plurality of audio modes; a second module configured to receive at least one input from a user for selecting at least one of the plurality of audio modes; and a third module configured to transmit audio data based, at least partially, on the selected audio mode, wherein one or more parameters of the transmitted audio are determined based on the selected at least one of the plurality of audio modes.

BRIEF DESCRIPTION OF THE DRAWINGS

Example embodiments will now be described, by way of example only, with reference to the following schematic drawings, in which.

DETAILED DESCRIPTION

Figure 1:
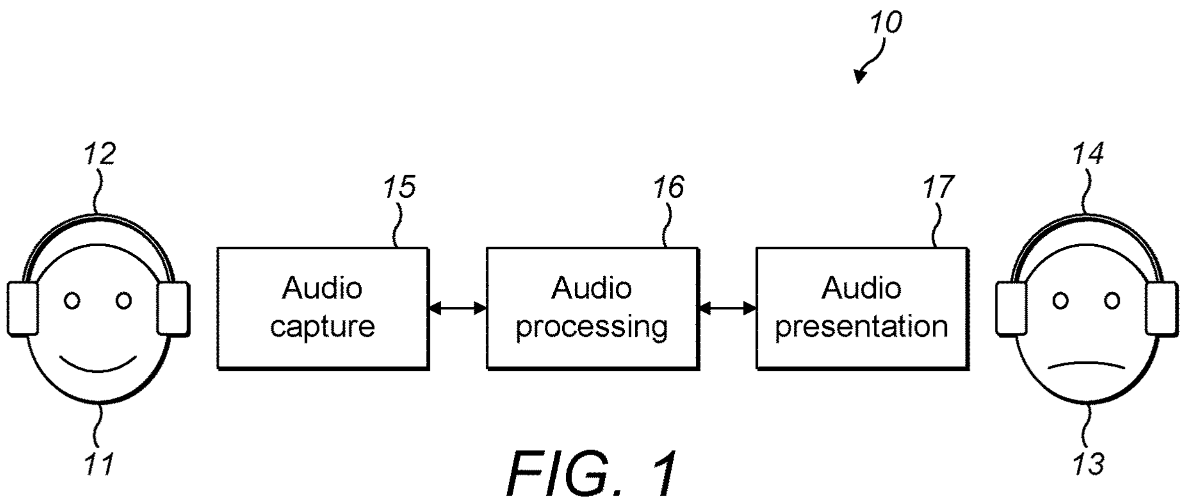
FIGS. 1 to 3 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. System 10 shows audio communication between a transmitting user 11 and a receiving user 13. The audio communication may be performed using one or more of an audio capture module 15, an audio processing module 16, and an audio presentation module 17. For example, the audio capture module 15 may capture one or more audio signals at the transmitter side, where the one or more audio signals may be related to the speech of the transmitting user 11, or any other audio (e.g. instruments, noise, ambient audio, etc.). The captured audio signals may be processed at the audio processing module 16, and then presented by the audio presentation module 17 to the receiving user 13. For example, the audio presentation module 17 may present the audio to the receiving user 13 in a user device (e.g. using a user interface of the user device).

The transmitting user 11 may optionally be using an audio device 12 (e.g. a headphone, earphones, etc., which may include a microphone), and the receiving user 13 may be using an audio device 14 (e.g. headphone, earphones, etc.). Alternatively, or in addition, the transmitting user 11 and/or the receiving user may use speakers for audio outputs and/or one or more microphones for audio input. Transmitting user 11 and receiving user 13 may use audio devices 12 and 14 that are similar or different. For example, the audio capture and presentation paths of a user device and/or audio devices used by a transmitting user and a receiving user may be symmetric or asymmetric.

Figure 2:
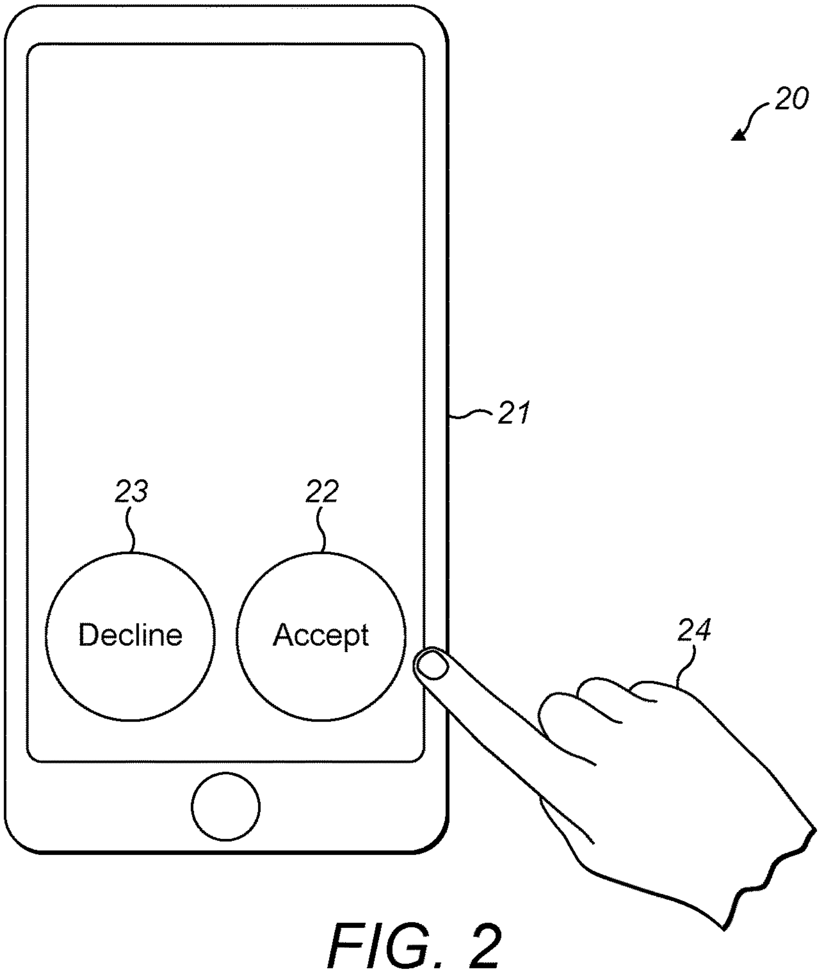

FIG. 2 is a block diagram of a system, indicated generally by the reference numeral 20, in accordance with an example embodiment. System 20 comprises a user device 21, for example, used by the receiving user 13. The user device 21 may comprise a user interface for presenting audio and/or related information to the receiving user 13. For example, an incoming audio indication may be provided to the receiving user 13 at the user device 21. The incoming audio indication may be provided in response to an incoming audio from the transmitting user 11. For example, the incoming audio may relate to an incoming call, and the incoming audio indication may be an incoming call indication. The incoming call indication may comprise an accept element 22 and a decline element 23. The receiving user 13 may provide inputs using the input 24. For example, the receiving user 13 may provide an input to accept the incoming call by tapping on the accept element 22. Alternatively, the receiving user 13 may provide an input to decline the incoming call by tapping on the decline element 23. Alternatively, or in addition to, the receiving user 13 may provide a different kind of input, such as an audio input to accept or decline the incoming call. As an example, the incoming call may be an audio call or a video call.

Figure 3:
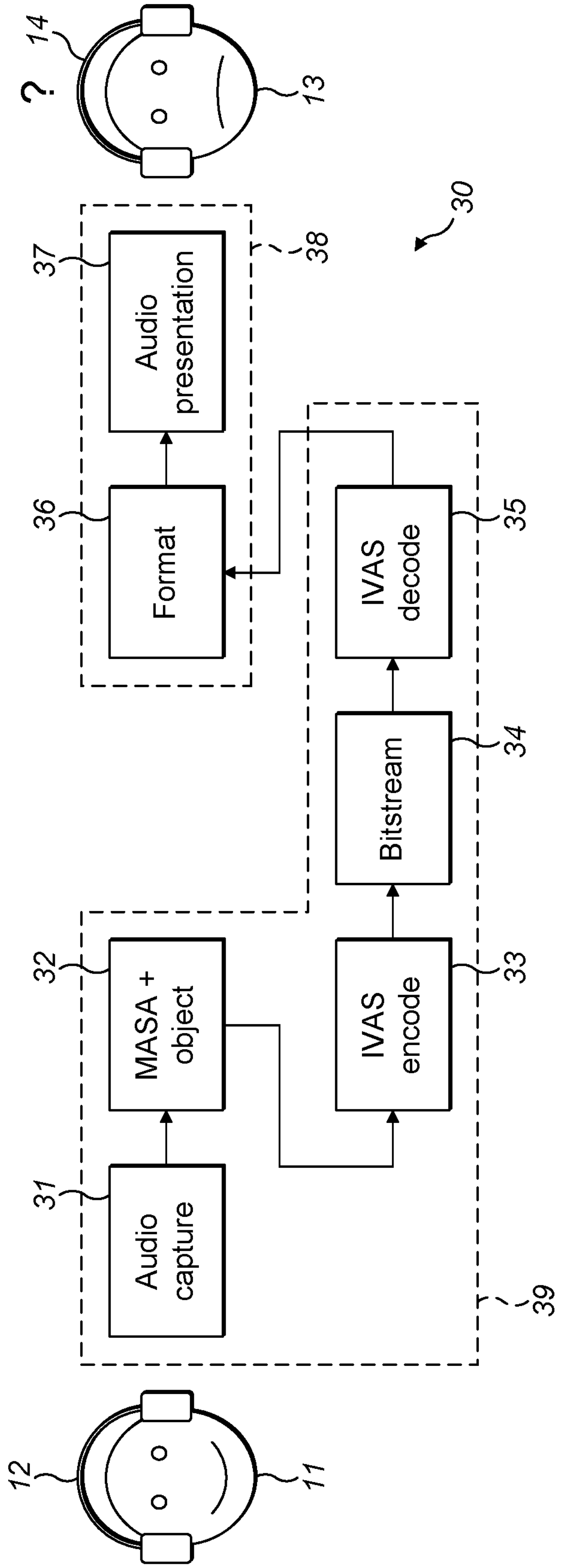

FIG. 3 is a block diagram of a system, indicated generally by the reference numeral 30, in accordance with an example embodiment. Similar to system 10 of FIG. 1, audio communication may be performed between the transmitting user 11 and the receiving user 13 using one or more elements shown in system 30. System 30 shows audio capture module 31 (similar to the audio capture module 15), an audio processing module 39 including a plurality of processing steps 32 to 35, and an audio presentation module 38 comprising formatting step 36 and audio presentation step 37. The audio communication shown in system 30 may be used to provide immersive (e.g. spatial) audio to the receiving user 13.

In one example, the audio capture module 31 may comprise one or more microphones (e.g. a microphone array) for capturing audio on the transmitter side. For example, at least one microphone may be used for capturing a first audio from one or more objects of interest (e.g. the speaker, instruments, etc.), and at least one microphone may be used for capturing a second audio related to spatial ambience. The first audio and the second audio may be combined by generating an audio format, for example, using a combination of metadata assisted spatial audio (MASA) and object-based audio. As such, the audio captured at the audio capture module 31 may be formatted in a combination of MASA and object-based audio in the processing step 32. The formatted audio may be provided to an Immersive Voice and Audio Services (IVAS) encoder at the processing step 33 for encoding the audio. The encoded audio may be transmitted in an encoded bitstream (processing step 34) to an WAS decoder at the receiver side. The WAS decoder may decode the encoded audio at the processing step 35 and the decoded audio may be formatted at the formatting step 36 and presented at the audio presentation step 37. The audio formatting, encoding, and decoding are described in further detail with reference to FIG. 17.

In some examples, audio input formats or representations other than MASA format and object-based audio may similarly be used in conjunction with the WAS codec. Alternatively, or in addition, any immersive or spatial audio coding other than WAS may be used.

In one example, immersive or spatial audio may refer to an audio representation and experience where the user may hear sounds from various directions including sources with elevation. While immersive/spatial audio may be considered very life-like, spatial audio may be achieved with traditional surround audio where the audio is conveyed in a format directly aimed at reproducing with a certain loudspeaker layout (e.g., 5.1 or 7.1 loudspeaker presentation). Spatial audio reproduction may also include such two-dimensional setups. In general, immersive audio presentation may often assume the use of headphones, which can be head-tracked. Immersive audio can describe an audio scene at a specific listening position where user can only rotate their head (three degrees-of-freedom—3DoF) or it can allow also for translation (six degrees of freedom—6DoF).

For spatial audio communications, the main focus may be headphone presentation. Thus, for example, a scene described using MASA, Ambisonics, channel-based configuration, audio objects, or a suitable combination thereof is typically binauralized for headphones listening for the audio rendering or presentation stage. This audio rendering or presentation at the headphone may externalize the scene allowing the user to hear the directional sound sources outside their head. Traditional stereo and mono audio are localized inside listener's head in headphone listening. In addition to headphone presentation it is however possible to support also loudspeaker configurations starting from regular mobile phone earpiece. Of course, many alternative configurations could be provided.

In one example, the example embodiments may use immersive audio codecs supporting a multitude of operating points ranging from a low bit rate operation to transparency as well as a range of service capabilities, e.g., from mono to stereo to fully immersive audio encoding/decoding/rendering. An example of such a codec is the 3GPP WAS codec.

For example, input audio signals may be presented to the WAS encoder in one of the supported formats (and in some allowed combinations of the formats). Similarly, the decoder may output the audio in a number of supported formats. Independent mono streams with metadata refer to object-based audio.

The multitude of different audio formats and their combinations as supported by 3GPP WAS may result in a significantly enhanced user experience, when an optimal listening system is available and employed for the listener. This may apply both in communications (such as 5G voice calls) and user-generated content (UGC, e.g., audio experience recordings, VR videos, etc.) that may, for example, be streamed live or edited for sharing or streaming (e.g., video blogging). However, the listening configuration (e.g. for a user receiving the audio, such as the receiving user 13) that is optimal for a particular call or streaming session will depend on both the content (e.g., number of talkers, availability or absence of ambience) and the formats (e.g., 5.1, MASA, objects, combination, etc.).

With reference to FIG. 3, the transmitting user 11 may initiate a call with the receiving user 13. The call (on the transmit side) may be based on an audio capture (at the audio capture module 31) from more than one microphone, e.g., a microphone array for at least a spatial ambience and an additional microphone for dedicated voice pick-up. The audio may be generated in the transmitting device in an input audio format based on a combination of MASA and object-based audio (32). This input audio is fed to the WAS encoder 33, which transmits an encoded bitstream received by the WAS decoder 35. It may be desirable to determine the most suitable output audio format and/or audio presentation for receiving user 13 (for example, based on the receiving device's network capability and/or receiving user's preference).

Figure 4:
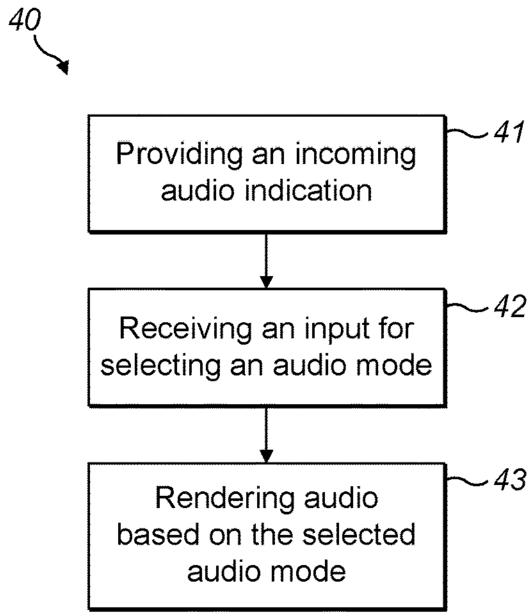
FIG. 4 is a flowchart showing an algorithm in accordance with an example embodiment.

FIG. 4 is a flowchart of an algorithm, indicated generally by the reference numeral 40, in accordance with an example embodiment.

At operation 41, an incoming audio indication may be provided in response to incoming audio. For example, the incoming audio indication may be provided at a user device (e.g. a user device used by the receiving user 13) when the user device receives the incoming audio. The incoming audio indication may comprise one or more representations of a plurality of audio modes (e.g. spatial dimensions of audio). For example, the plurality of audio modes may be related to different levels of spatiality or immersiveness of the audio output. In some examples the representations may comprise one or more of visual representation(s), audio representation(s), haptic representation(s) and/or the like.

At operation 42, an input may be received from a user (e.g. the receiving user 13) for selecting one of a plurality of audio modes. For example, the user may be able to choose the level of spatiality or immersiveness by providing the input.

At operation 43, audio is rendered based, at least partially, on the selected audio mode. One or more parameters of the rendered audio may be determined based on the selected audio mode. The operations of FIG. 4 are explained in further detail below with respect to FIGS. 5 and 6.

Figure 5:
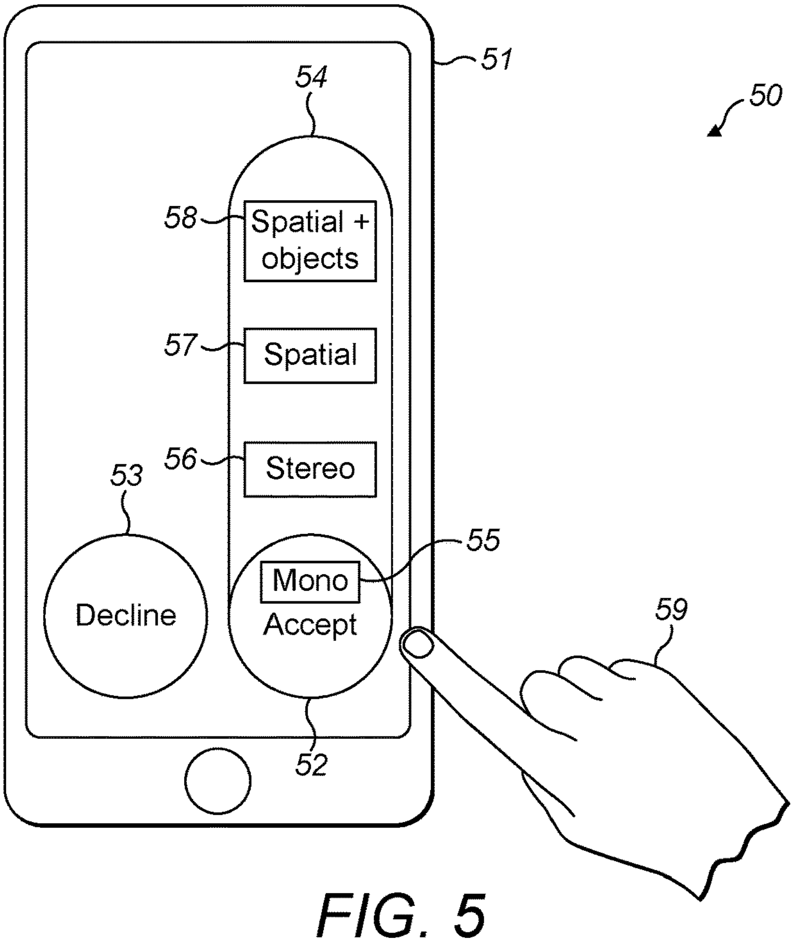
FIGS. 5 to 9 are block diagrams of systems in accordance with example embodiments.
Figure 6:
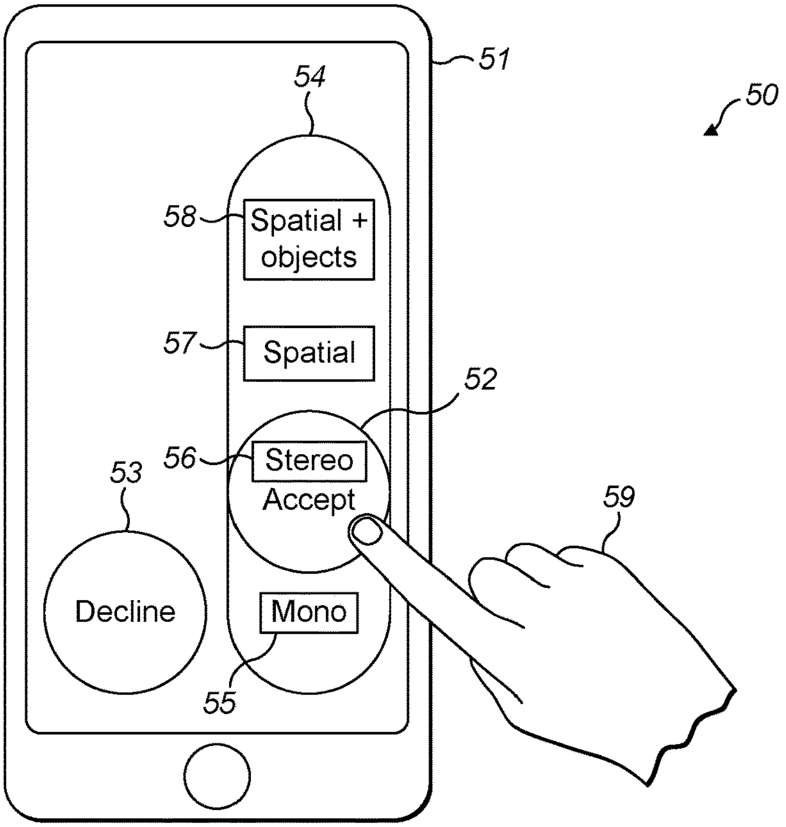

FIGS. 5 and 6 are block diagrams of a system, indicated generally by reference numerals 50 and 60 respectively, in accordance with example embodiments. The block diagrams 50 and 60 both show a user device 51 comprising an incoming audio indication (e.g. provided on a screen of the user device 51), such as the incoming audio indication provided in response to an incoming audio in operation 41. For example, the incoming audio indication may comprise an incoming call indication provided in response to an incoming call (e.g. the receiving user 13 may be receiving incoming audio and/or a call from the transmitting user 11 in a user device 51).

At least one input (e.g. one or more inputs) may be received from a user, for example, using the touch input 59. The incoming call indication shown in the user device 51 comprises an accept element 52, a decline element 53, and an audio mode selection element 54. The audio mode selection element 54 may comprise representations of a plurality of audio modes, for example, including representations for a mono mode 55, a stereo mode 56, a spatial mode 57 (e.g. spatial audio mode) and a spatial objects mode 58 (e.g. spatial audio with objects mode). The plurality of audio modes are described in further detail below with reference to FIG. 7. (Of course, the audio modes 55 to 58 are provided by way of example only; other options and combinations of options are possible.)

For example, the touch input 59 may be provided such that the incoming audio may either be accepted using (e.g. touching) the accept element 52, or may be declined using (e.g. touching) the decline element 53. If the incoming audio is declined, the incoming audio indication may be removed from the screen. If the user wants to accept the incoming audio, the user may select one of the plurality of audio modes provided in the audio mode selection element 54. For example, in order to accept the incoming audio with a preferred audio mode, the accept element 52 may be dragged along the audio mode selection element 54 and may be released when the accept element 52 is in line with the preferred audio mode. As shown in the block diagram 50, the touch input 59 may select the mono mode 55 by releasing the accept element 52 in line with the mono mode 55. As shown in the block diagram 60, the touch input 59 may select the stereo mode 56 by dragging the accept element 52 along the audio mode selection element 54, and then releasing the accept element 52 in line with the stereo mode 56. Similarly, the accept element 52 may be dragged further along the audio mode selection element 54 for selecting the spatial mode 57 or the spatial objects mode 58.

In one example, the mono mode may comprise monaural audio. In monaural audio one single channel may be used. For example, monaural audio may be reproduced through several audio output devices (e.g. speakers, headphones) using one or more channels, but all audio output devices may be reproducing the same copy of the audio signal.

In one example, the stereo mode may comprise stereophonic audio. In stereophonic audio, a plurality of channels (typically two channels) may be used. Stereophonic audio may provide a directional perspective, such that sounds can be perceived to originate from the direction of the left speaker, the right speaker, or between the speakers. With certain processing of the stereo signal, it is possible to extend the sound image also beyond the speakers so that the listener can perceive sounds emanating from outside the line connecting the two speakers.

In one example, the spatial mode may comprise ambisonic audio, which is a full-sphere scene based audio format, such that sound sources in a horizontal plane, as well as above and below the horizontal plane can be represented. As such, ambisonic audio may provide a higher level of immersion and directional sound perception compared to stereophonic audio. Ambisonic audio carries a full spherical representation of a sound field, which, when rendered to a user, can create an audio percept as if the user's head was located at the location of the device capturing the Ambisonic audio, or, in the case of synthetically created Ambisonic audio, at the centre of the ambisonic sound field. Ambisonic audio can be carried in different formats; examples being B-format or HOA transport format (HTF). Ambisonic audio differs from traditional surround audio formats because it does not directly carry speaker signals, but instead a representation of the sound field, which is then decoded or rendered to a loudspeaker or binaural output signal. Ambisonic audio can be first order ambisonics (FOA) or higher order ambisonics. The higher the order, the better the spatial resolution of the ambisonic representation may be. The better the spatial resolution, the sharper or more accurate spatial percept of a sound source in a certain spatial direction can be transmitted and created.

Another example of spatial audio formats is Metadata-assisted spatial audio (MASA), which is a parametric spatial audio format and representation. On high level, it can be considered a representation consisting of 'N channels+ spatial metadata'. It is a scene-based audio format particularly suited for spatial audio capture on practical non-spherical devices, such as smartphones. The idea is to describe the sound scene in terms of time- and frequency-varying sound source directions and energy ratios. Where no directional sound source is detected, the audio is described as diffuse, and is intended to be reproduced without any apparent direction of arrival but from all directions. In MASA (as currently proposed for 3GPP IVAS), there can be one or two directions for each time-frequency (TF) tile. The spatial metadata is described relative to the directions and can include, e.g., spatial metadata for each direction and common spatial metadata that is independent of the number of directions.

In one example, the spatial audio with objects mode may comprise, in addition to the basic scene based audio representation such as ambisonics or MASA, one or more spatial audio objects. A spatial audio object can contain at least one audio signal and a metadata stream containing the object position, for example, as polar coordinates in azimuth, elevation, distance representation, for example. Other object metadata can be included as well, such as its size or extent or its directionality. Object metadata indicates how the object is to be rendered during playback; for example, an object is spatially positioned by the renderer using its object position metadata. As such, the spatial audio with objects mode may be similar to the spatial mode, but may provide further emphasis on objects of interest. One of the differences between the spatial audio mode and the spatial audio with objects mode may be that in a spatial audio with objects mode, the properties of the individually provided objects can be modified during rendering. For example, the rendered audio of an audio object may be manipulated such that the audio source is brought nearer and therefore audio from that audio source is rendered in relatively higher volume compared to other audio sources. Or as another example, an audio object can be spatially repositioned to a different spatial position so that its sound appears to emanate from the new direction instead of the old direction, whereas a repositioning of a spatial audio sound field is understood in terms of rotating the whole scene around the user (i.e., the audio sources in the sound field are not individually repositioned). Spatial audio with objects may be transported either as a combination of a spatial audio transport signal and objects transport signal, or then as a single transport signal where additional side information to a spatial audio signal is included so that the additional side information enables recovering the object audio signal from the spatial audio signal.

In one example, spatial objects mode may also contain only audio from objects without the spatial audio signal.

It should be noted that the audio modes (e.g. spatial dimensions) may in various implementations differ from the examples provided above, such that there may be one or more audio modes other than the mono, stereo, spatial audio, and/or spatial audio with objects mode. In general, mono, stereo (e.g. binaural stereo), and spatial audio may be considered as common spatial dimensions. Furthermore, the availability of objects in addition to or instead of a spatial audio mode or other audio modes may be indicated as a spatial dimension.

In some examples, the audio modes available for selection by the user may be dependent upon various factors, including one or more of preferences of a transmitting user of the incoming audio; network capabilities of a transmitter of the incoming audio; network capabilities of the receiver of the incoming audio; and/or a level of audio present in the incoming audio. For example, the audio mode selection element 54 may only comprise representations for audio modes that are available for selection by the user.

In one example, the availability of one or more audio modes may be dependent on preferences of a transmitting user of the incoming audio. For example the transmitting user 11 may specify the audio modes that should be made available to the receiving user 13. As such, in one example, if the transmitting user 11 prefers to limit the level of spatiality in the incoming audio rendered to the receiving user 13, the transmitting user may only specify low spatiality level audio modes, such as the mono mode 55. Alternatively, if the transmitting user 11 prefers to allow higher levels of spatiality and immersiveness in the audio provided to the receiving user 13, the transmitting user 11 may allow a plurality of the audio modes (e.g. mono, stereo, spatial, spatial objects) to be made available for selection by the receiving user 13. In some examples, at least mono mode availability may be required in order to guarantee communications. However, the transmitting user 11 may, in some examples, not allow stereo or some higher spatiality modes (e.g. spatial mode and/or spatial objects mode) to be made available for selection by the receiving user 13.

In another example, the availability of one or more audio modes may be dependent on network capabilities of the transmitter of the incoming audio. For example, if a network connection at the transmitter's side is weak, the transmitter's device may not be able to provide audio data related to higher levels of spatiality (e.g. audio components for stereo, spatial, and/or spatial objects modes), and may only be able to provide audio data for the mono mode. For example, this inability to provide audio data related to higher levels of spatiality may be due, e.g., to the bit rate allocated for the call.

In another example, the availability of one or more audio modes may be dependent on network capabilities of the receiver of the incoming audio. For example, if a network connection at the receiver's side is weak, the receiver's device may not be able to receive and/or render audio data related to higher levels of spatiality (e.g. audio components for stereo, spatial, and/or spatial objects modes), and may only be able to receive and/or render audio data for the mono mode. For example, this inability to receive audio data related to higher levels of spatiality may be due, e.g., to the bit rate allocated for the call.

Figure 7:
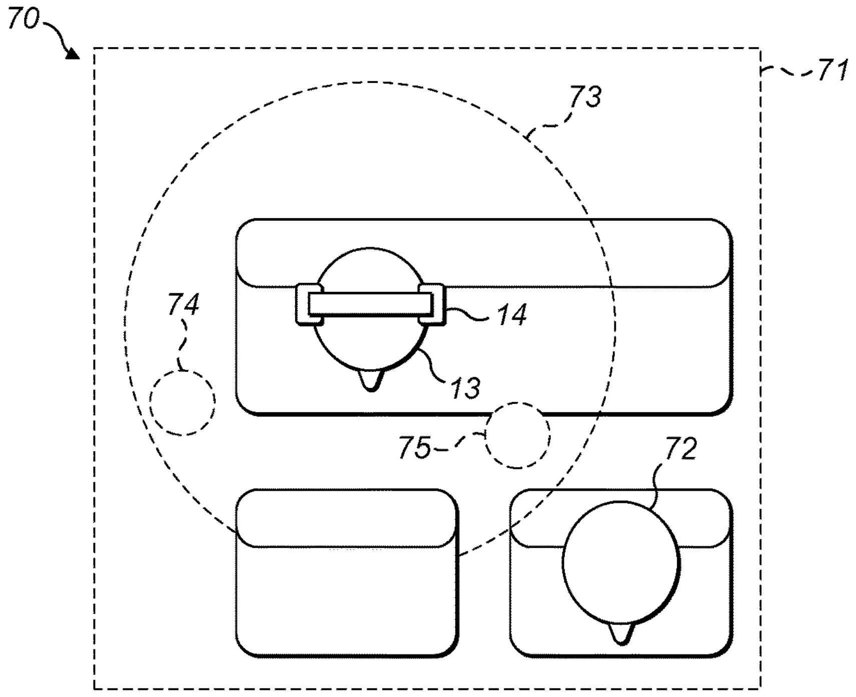

FIG. 7 is a block diagram of a scene, indicated generally by the reference numeral 70, in accordance with an example embodiment. The scene 70 shows a top view of a user, such as the receiving user 13, in an environment, such as a car 71. For example, the receiving user 13 may be sitting in a back seat of the car 71, while a driver 72 is sitting in the driving seat. The receiving user 13 may be wearing an audio device 14, such as, for example headphones, earphones, or the like. For example, the audio rendered to the receiving user 13 may comprise a spatial scene 73 (e.g. a virtual spatial scene) and one or more spatial audio objects 74 and 75 (e.g. virtual audio objects). In one example, the spatial scene 73 and spatial audio objects 74 and 75 may be based on a spatial scene and audio objects on the transmitter side.

In an example embodiment, with reference to FIG. 4, the audio rendered at operation 43 may comprise an audio preview of the selected audio mode. For example, in the scene 70, it may be desirable for the receiving user 13 to preview the spatiality sounds in the relevant environment (e.g. how audio from one or more audio sources are rendered or the perceived locations of one or more audio sources). For example, the receiving user 13 may wish to have a spatial call (for immersion), but not lose track of where the car is going or lose their ability to hear what the driver 72 is saying. Thus, the receiving user 13 may wish to preview audio mode options and fine-tune the experience.

Figure 8:
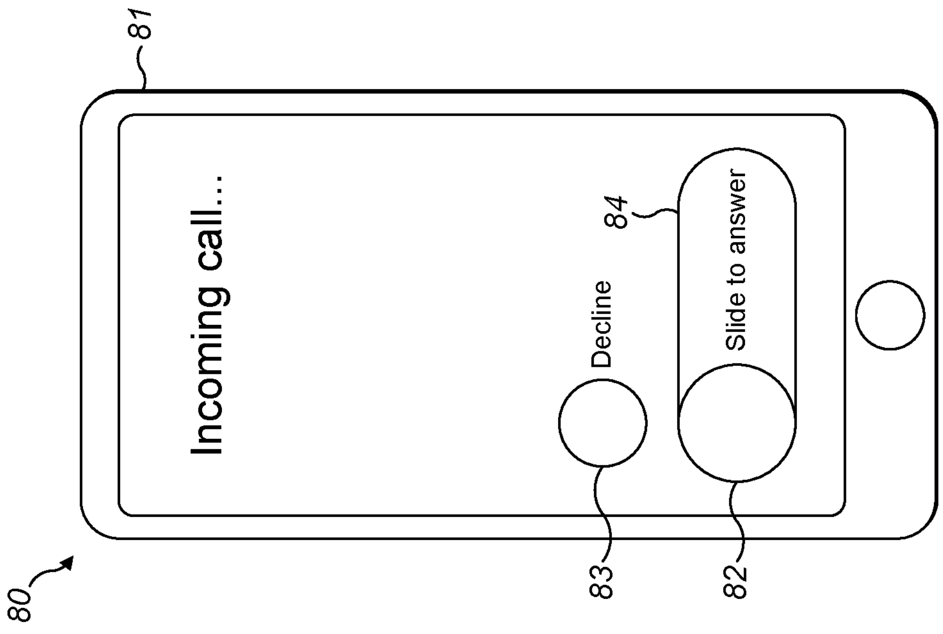

FIG. 8 is a block diagram of a system, indicated generally by the reference numeral 80, in accordance with an example embodiment. System 80 shows an incoming audio indication provided at a user device 81 in response to an incoming audio (e.g. an incoming call). The incoming audio indication may comprise an accept element 82, a decline element 83, and a slide element 84, such that the accept element 82 may be dragged along the slide element 84 for accepting the incoming audio.

Figure 9:
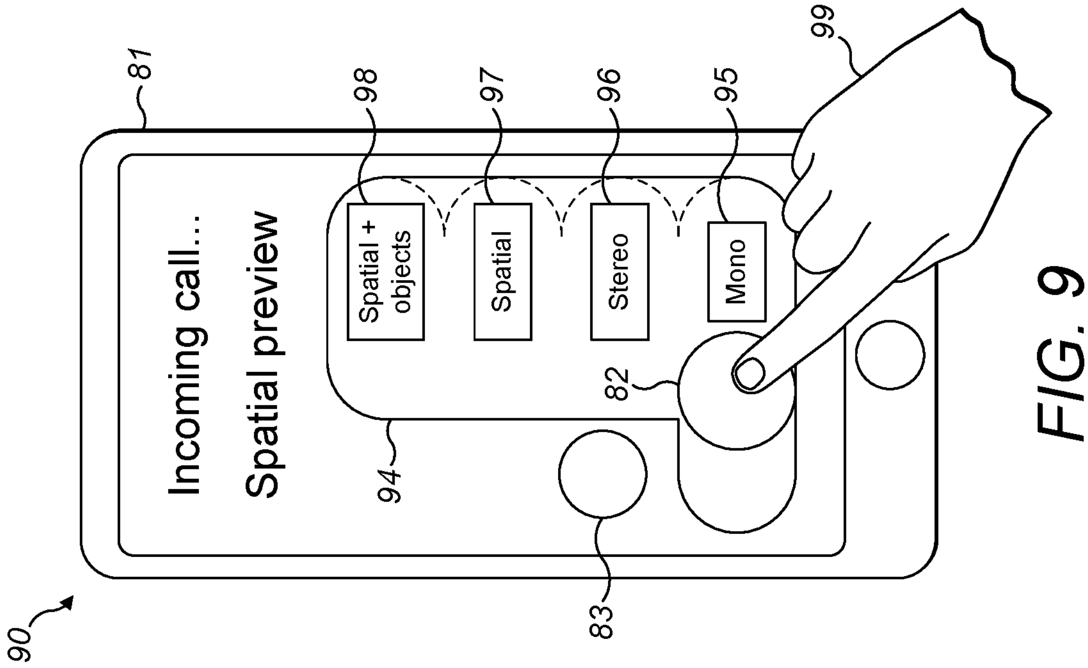

FIG. 9 is a block diagram of a system, indicated generally by the reference numeral 90, in accordance with an example embodiment. System 90 shows an incoming audio indication provided at the user device 81 in response to the incoming audio (e.g. an incoming call). System 90 further shows an audio mode selection element 94 that may be presented to the user when the accept element 82 is dragged along the slide element 84. The audio mode selection element 94 may provide representations of a plurality of audio modes to the user, such that the user may be able to preview one or more audio modes, for example, using touch input 99. The plurality of audio modes may comprise one or more of a mono mode 95, a stereo mode 96, a spatial mode 97 (e.g. spatial audio mode), and a spatial objects mode 98 (e.g. spatial audio with objects mode). The user may preview one or more audio modes by dragging the accept element 82 along the audio mode selection element 94 in line with the respective audio mode.

For example, the accept element 82 may be dragged by the touch input 99 to the mono mode 95 for rendering an audio preview of the mono mode 95. Similarly, the accept element 82 may be dragged by the touch input 99 to the stereo mode 96 for rendering an audio preview of the stereo mode 96; the accept element 82 may be dragged by the touch input 99 to the spatial mode 97 for rendering an audio preview of the spatial mode 97; and the accept element 82 may be dragged by the touch input 99 to the spatial objects mode 98 for rendering an audio preview of the spatial objects mode 98.

In one example, one or more audio modes may be previewed before or after an audio mode is selected. For example, in the event that the incoming audio relates to an incoming call, the audio modes may be previewed before or after the call is answered. In order to avoid delaying the answering of the incoming call, the user may prefer to continue previewing the various audio modes after the incoming call has been answered before confirming their initial audio presentation mode selection.

For example, with reference to FIG. 9, the touch input 99 may initially answer the incoming call in mono mode 95 by dragging the accept element 82 and releasing the accept element 82 in line with the mono mode 95. The user may then continue to preview the one or more audio modes 95 to 98. For example, after the call has been answered, the touch input 99 may drag the accept element along the audio mode selection 94 for previewing the various audio modes. When the accept element 82 is placed in line with the stereo mode 96, audio may be rendered with the stereo mode, such that the parameters of the rendered audio are corresponding to the stereo mode. Similarly, when the accept element 82 is placed in line with the spatial mode 97 or the spatial objects mode 98, the audio may be rendered with the spatial mode or the spatial objects mode respectively.

In another example, the touch input 99 may initially answer the incoming call by dragging the answer element 82 towards the bottom right end of the audio mode selection element 94 (without releasing the accept element 82). Once the call is answered, the touch input 99 may continue to hold the accept element 82 and drag the accept element 82 along the audio modes 95 to 98 for previewing the respective audio modes. As such, the audio mode selection element 94 may still be available to the user for selection and/or previewing of one or more audio modes. As such, in order to select an audio mode, the touch input 99 may release the accept element in line with the preferred audio mode for selection.

In an example embodiment, the user interface provided at the user device 81 may change after the incoming audio is accepted. For example, based on the selected audio mode or audio mode being previewed, the user interface may provide further control elements for previewing and/or selecting different scene orientations, object orientations, spatial directions and/or orientations, or the like. Such example control elements are described in further details below with reference to FIGS. 13 to 16.

In one example, the ability to preview the audio modes may only be provided for a threshold time period after the call is answered.

In an example embodiment, the ability to preview audio modes may be limited to the threshold time period in order to facilitate bit rate adaptation. For example, when the incoming audio is received, the incoming audio may comprise audio of the highest spatial dimension (e.g. spatial objects mode), such that the user may be able to choose any audio mode (the highest spatial mode provided, or lower spatial modes) for rendering the audio. In the event that the user selects an audio mode that has a lower spatial dimension than the highest spatial dimension, the selection may be used, for example, for signalling the transmitting device to reduce the transmitted spatial dimension and bit rate (e.g. for reducing resources used for transmission, as the higher spatial dimension was not selected by the receiving user, and therefore need not be rendered). In the event that the receiving user wishes to receive higher spatial dimension audio after having selected the lower spatial dimension, the receiving user may send a request to the transmitting user to receive higher spatial dimension audio. The transmitter may then respond to the request by sending higher spatial dimension audio, and there may be some delay between the receiver requesting and receiving the higher spatial dimension audio. However, when the incoming audio is still being previewed, for example up to the threshold time period, the signal for reducing the transmitted spatial dimension is not sent, such that the user may be able to switch between audio mode previews without having to wait (e.g. delay) for higher spatial dimensions audio to be sent by the transmitter. As such, it may be beneficial to limit the ability to preview audio modes to the threshold time period in order to free the resources required for higher spatial dimensions after the threshold time period.

In an example embodiment, the ability to preview audio modes may be limited to the threshold time period in order to provide further user interface elements once the receiving user has selected an audio mode. For example, during the preview of audio modes, before selection of any audio mode, the user interface may display the various audio modes for easy previewing. After selection of an audio mode, the user interface may be altered in order to provide further functionalities, such as controlling the position in a spatial scene, positions of one or more spatial objects, or the like. These further functionalities may be provided based on the selected audio mode. As such, after the threshold time period, the further user interface elements may be provided to the receiving user in order to provide control of further functionalities.

In an example embodiment, the threshold time period may be applied for reducing processing power required for previewing various audio modes (e.g. switching between audio modes) either on the receiving device or transmitting device. Alternatively, or in addition, the receiving user may preview audio modes any time during the call, such that no threshold time period is applied. For example, even if audio data for higher spatial dimensions are not available from the transmitter, the receiving user may preview the audio modes using local audio data, as explained in further detail below with reference to FIGS. 10 and 11.

In one example, the receiving user (e.g. receiving user 13) may therefore preview the audio modes prior to answering the incoming call, such that the audio previews are provided using suitable available audio. The suitable available audio may include simulated local audio data (e.g. in the absence of real call audio data), as explained in further detail below with reference to FIG. 7. The receiving user 13 may also preview the audio modes after answering the call, such that the audio previews may be provided using at least the real audio data received in the incoming call audio.

In an example embodiment, the transmitting device may indicate the audio modes that may be available to the receiving device for rendering (e.g. previewing and/or selecting). The receiving device may only be able to select an audio mode from the audio modes made available by the transmitting device. The receiving device may also indicate one or more audio modes that the receiving user may wish to render at the receiving device (e.g. for previewing and/or selecting). As such, in case the audio modes made available by the transmitting device's indication are of lower spatial dimensions than the audio modes indicated for rendering by the receiving device, a negotiation may be performed between the transmitting device and the receiving device. For example, the receiving device may send a request to the transmitting device for making audio of higher spatial dimension available for rendering at the receiving device. The transmitting device may, in response to the request, send the audio of higher spatial dimension to the receiving device, thus allowing the higher spatial dimension audio mode(s) to be available for rendering (e.g. previewing and/or selecting) at the receiving device. The audio negotiation may be part of an ongoing call (e.g. an audio or voice call, or a video call) or happen prior to connecting the call.

It should be noted that the touch inputs, and dragging and releasing inputs are examples only, such that other implementations of the user interface are possible, such that an audio mode may be selected using inputs other than touch inputs, dragging inputs, and releasing inputs. As one example, an audio mode may be previewed and selected using voice or audio input. A receiving user may, for example, utter the word "mono" to hear a preview of how the incoming call's audio would sound when rendered in mono, "stereo" to hear a preview of how the incoming call's audio would sound in stereophonic audio, "spatial" to hear a preview of how the call's audio would sound rendered in spatial audio, "full" to hear a preview of how the call's audio would sound rendered in spatial audio with sound of one or more objects also rendered.

Figure 10:
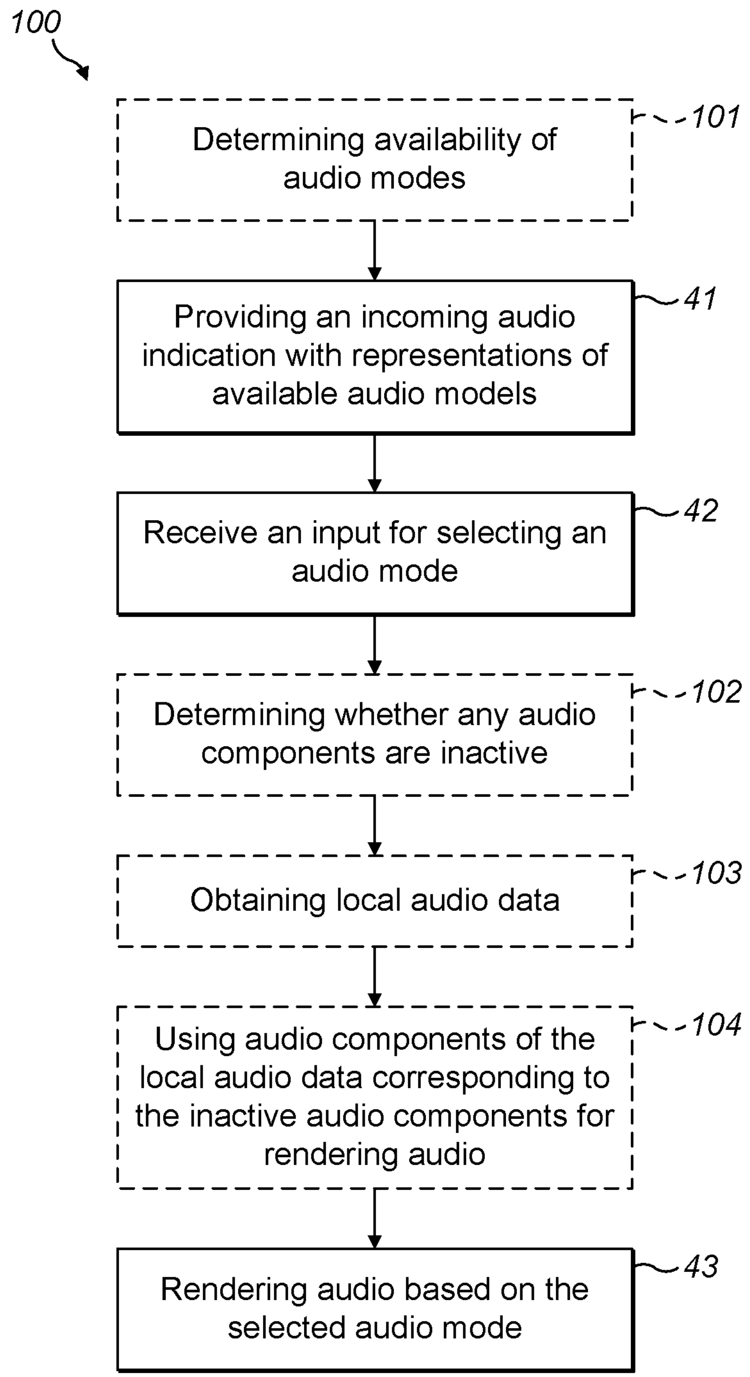
FIGS. 10 to 12 are flowcharts showing algorithms in accordance with example embodiments.

FIG. 10 is a flowchart of an algorithm, indicated generally by the reference numeral 100, in accordance with an example embodiment.

At operation 101, the availability of one or more audio modes (e.g. mono, stereo, spatial audio, spatial audio with objects) may be determined. For example, as described above, in some examples, the audio modes available for selection by the user may be dependent upon various factors, including one or more of preferences of a transmitting user of the incoming audio; network capabilities of a transmitter of the incoming audio; network capabilities of the receiver of the incoming audio; one or more preferences of a receiving user of the incoming audio, one or more capabilities of a receiving user's device, and/or a spatial level of audio present in the incoming audio. As an example, a receiving user may specify that for incoming calls from certain contacts or phone numbers all audio mode options are offered for preview and selection whereas for unsolicited calls or calls from unknown numbers only mono and stereo mode are offered for selection. For example, the receiving device may be able to determine, based on default preferences of the receiving user, which audio modes to be displayed for an incoming audio indication. In an example, the user could specify default preferences in settings of the receiving device that when their family members call (calling line identification indicates who is calling), then all audio modes are to be displayed; if an incoming call comes from a telephone conference number (e.g. the user has selected 'call me' when joining a telco), then only mono, stereo and spatial audio modes are to be displayed; and if an incoming call comes from an unknown number, then only mono and stereo modes are to be displayed. However, if the user realizes after accepting the call that the user indeed knows the caller (or regardless of that) the user could then, during the call, select an option to render audio in the spatial audio mode or the spatial objects mode, given that the transmitting end supports these modes.

In an example embodiment, for a telephone conference (telco), an audio mode may be provided for object audio. For example, each telco participant may be preferably represented as a mono voice only (such that the ambient audio or spatial audio of each participant is not rendered in the telco). These mono voice signals would then be given a virtual 3D position by the conferencing system, which then sends downstream the audio object streams (of at least the active talkers).

As another example, if the receiving user's device does not support rendering of spatial audio then only supported audio modes would be offered for preview and selection. For example, if a headset (e.g. headphones, earphones, etc.) or a speaker is connected to the receiving device for rendering the audio, all audio modes may be displayed for rendering (previewing and/or selecting), as the headsets or speakers may have the capability for rendering audio with higher spatial dimensions. In case no headset or speaker is connected to the receiving device, one or more audio modes with higher spatial dimension (e.g. spatial mode or spatial objects mode) may not be displayed, as the receiving device itself may not have the capability for rendering audio with higher spatial dimensions. As such, the determination of whether audio modes are displayed for preview and/or selection may be based on the hardware capabilities.

At operation 41 (as described above with reference to FIG. 4), an incoming audio indication may be provided to the user, such that the incoming audio indication may comprise one or more representations of one or more audio modes that are determined to be available (e.g. at operation 101). For example, in an initial incoming call indication, only representations of lower complexity spatial audio, such as mono mode (and perhaps the stereo mode), regardless of whether the transmitting or receiving user devices have the capability for a higher complexity of spatial audio, such as spatial audio mode and spatial audio with objects mode. During the beginning of the call, the available bandwidth (e.g. of a 5G transmission channel) may be low, such that the initial bit rate of the call may be insufficient for higher complexity of spatial audio. Once the available bandwidth of the call is increased, the representations of audio modes related to the higher complexity may be provided to the user. For example, initially when the incoming audio indication is provided, the incoming audio indication may have representations of the mono mode and the stereo mode. After a threshold time period of answering the incoming call (e.g. with one of the mono or stereo mode selected), the representations for spatial mode and spatial objects mode may also be provided to the user, such that the user may then select any one of the mono, stereo, spatial, and/or spatial objects mode.

For example, the receiving user may have already selected a mode (e.g., mono or stereo), and while user is consuming the call (audio is being rendered with the selected audio mode), indication of availability of higher spatial dimension can be made in various ways. In another example, the user may have already selected an audio mode (e.g., mono or stereo) with the previewing ability still activated (e.g., until a threshold time period), and while the user is consuming the call, indication of availability of higher spatial dimension can be made in the previewing user interface (e.g. audio mode selection element 94) that is still available to user. In another example, the user may be previewing the available audio modes (e.g., mono and stereo) in the previewing user interface (e.g. audio mode selection element 94) while consuming" the call, and the indication of availability of higher spatial dimension can be made in the previewing user interface that is still being used by the user.

In another example, the representations of all audio modes are provided to the user for selection, but audio may only be rendered based on the available audio modes. For example, the user may be provided with representations for mono, stereo, spatial audio and/or spatial audio with objects mode with the incoming call indication, even if the initial bitrate is insufficient for transmitting the higher complexity of spatial audio (e.g. spatial audio or spatial audio with objects modes). The user may be able to select or preview any of the plurality of presented audio modes. However, while the bandwidth is low during the beginning of the call, the rendered audio may only be based on lower complexity of spatial audio, such as mono or stereo mode. The rendered audio may later be based on the higher complexity of spatial audio when the bandwidth is higher and the bitrate is sufficient. For example, if the user selects the spatial audio mode, the rendered audio in the beginning of the call may be based on mono mode due to insufficient bitrate. When the bandwidth of the call becomes higher, the rendered audio may be based on the spatial audio mode, as the user has already selected the spatial audio mode for rendering and/or presenting the audio.

In another example, the representations of all audio modes are provided to the user for selection, such that if the user selects one or more unavailable audio modes, the rendered audio modes may comprise local audio data corresponding to the unavailable audio modes.

At operation 42 (as described above with reference to FIG. 4), at least one input may be received from the user for selecting one of the plurality of audio modes. For example, the at least one input may be related to selecting an audio mode (e.g. systems 50 and 60), previewing an audio mode (e.g. system 90).

At operation 102, it may be determined whether one or more audio components are active or inactive. For example, one or more audio components of the incoming audio may be inactive. For example, the transmitting user 11 may be sending the incoming audio to the receiving user 13, where the incoming audio may have the voice of the transmitting user as an audio object. In the event that the transmitting user is located in a quiet space, and there is not much ambient audio or other audio sources in the transmitted scene, the incoming audio may not have any active spatial audio components or spatial object audio components. In such scenarios, it may be considered that audio components related to the stereo mode, spatial audio mode, and/or the spatial audio with objects mode may be inactive.

At operation 103, local audio data may optionally be obtained at the receiving user device. The local audio data may be obtained using a synthetic and/or any local audio material as an alternative representation of one or more inactive audio components. For example, the local audio data may be captured by the receiving device or it may be read from a file.

At operation 104, in order to render the audio based on a selected audio mode, one or more audio components of the local audio data corresponding to the one or more inactive audio components may be used. For example, if the selected audio mode is the spatial audio mode, and the spatial audio component of the incoming audio is inactive (e.g. if the transmitting user 11 is in a quiet space), a spatial audio component of the local audio data may be used for rendering the audio. The local audio data may be a synthetic simulation, for example, obtained by simulating how the incoming audio is likely to sound based on one or more of the inactive components. For example, the spatial audio component of the local audio data may be a simulation of the spatial audio component of the incoming audio.

At operation 43, the audio may be rendered based on the selected audio mode. For example, the rendered audio comprises one or more of the audio components of the incoming audio, and the one or more audio components of the rendered audio are dependent, at least in part, on the selected audio mode. In the event that one or more audio components of the incoming audio related to the selected audio mode are inactive, the corresponding one or more components of obtained local audio data may be used for rendering the audio.

In an example embodiment, audio may be being rendered to the user in a lower complexity audio mode (e.g. mono mode) due to unavailability (as determined at operation 101) or inactivity (as determined at operation 102) of one or more higher complexity audio modes (e.g. stereo, spatial audio, and/or spatial audio with objects). If audio related to a higher complexity audio mode becomes available at a later time, for example after an incoming call has been answered, the user may receive a notification and may be able to preview one or more (recently available or active) audio modes related to the higher complexity audio, for example, by interacting with the notification. The user may then also be able to select the one or more available audio modes or audio modes corresponding to the active audio components for rendering the audio.

In an example embodiment, a user selection of audio modes may be used for determining a bit rate allocation for the incoming audio (e.g. incoming call). For example, if the receiving user 13 prefers to receive audio with only mono mode (i.e., user selects the mono mode), it may not be preferable to consume a high bit rate on a more complex spatial representation. Instead, the bit rate may be reduced in transmission encoding such as to only transmit a mono bitstream.

In an example embodiment, at operation 43, the preview of audio modes may be rendered using local audio data (e.g. as obtained in operation 103). For example, the ability to preview the audio modes may be limited to a threshold time period, as described above. The receiving user may therefore have an understanding of spatial audio rendering. However, limiting the audio preview using local audio data to the threshold time period may provide the user a further understanding that some audio elements (e.g. local audio data) are not really part of the received incoming audio, such that, after the audio selection is made (e.g. after previewing has ended, or the threshold time period has ended), the receiving user may not be confused into thinking that the local audio is part of the transmitted audio.

Figure 11:
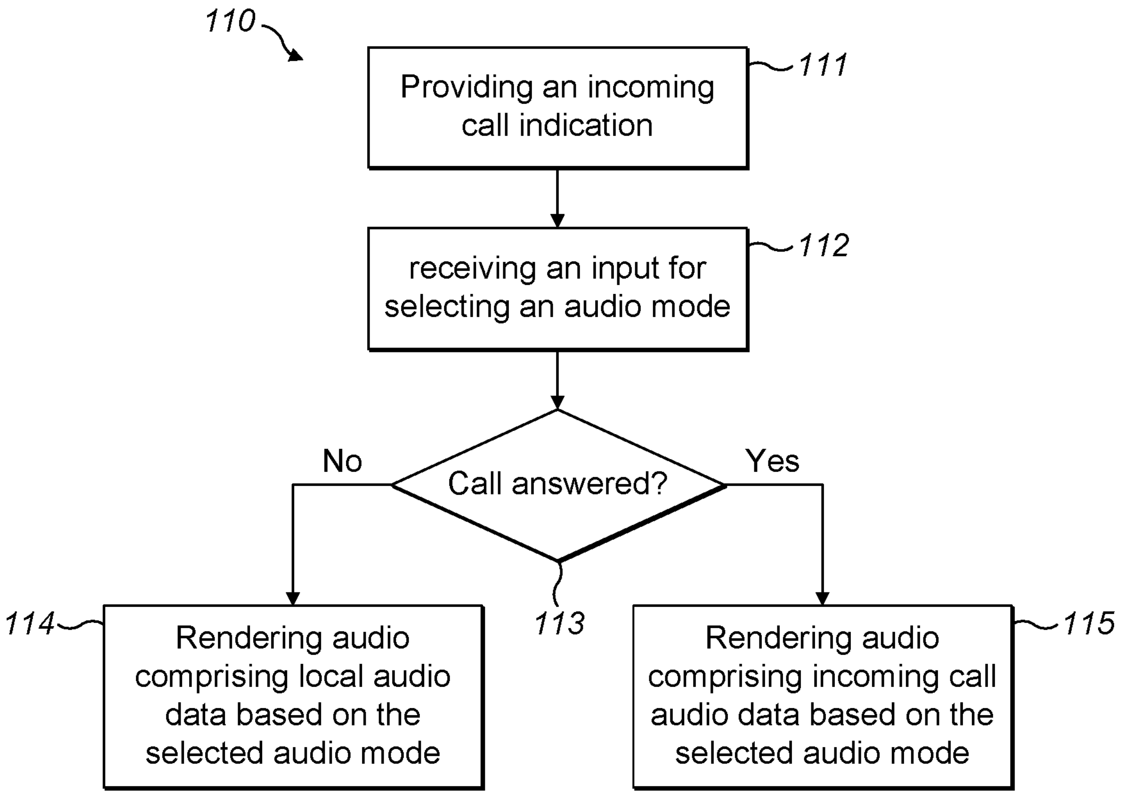

FIG. 11 is a flowchart of an algorithm, indicated generally by the reference numeral 110, in accordance with an example embodiment. As described above, the incoming audio indication may comprise an incoming call indication.

At operation 11, an incoming call indication may be provided to a user, such as the receiving user 13. The incoming call indication may comprise representations of a plurality of audio modes (e.g. mono mode, stereo mode, spatial audio mode, and/or spatial audio with objects mode, as shown in FIGS. 5, 6 and 9).

At operation 112, an input may be received from the user for selecting one of the plurality of audio modes. For example, the input may be for answering the incoming call with a selected audio mode and/or previewing audio for one or more selected audio modes before or after answering the call (e.g. by using the touch inputs for dragging and/or releasing an accept element, as described above with reference to FIGS. 5, 6 and 9). In other examples, other type of touch input or voice input may be used for answering and/or previewing audio for one or more selected modes before or after answering the call.

At operation 113, it is determined whether the call has been answered (e.g. using the accept element described with reference to FIGS. 5, 6, and 9, or having detected voice input).

In the event that the call has not been answered, at operation 114, the audio may be rendered such that the rendered audio comprises local audio data based on the selected audio mode. For example, prior to answering the call (e.g. prior to the availability of the incoming audio from the transmitting user), local audio data (e.g. synthetic audio obtained by simulation) may be used for providing the user with audio previews based on one or more selected audio modes. For example, the local audio data may comprise ring tones which may consists of separate audio tracks (such as instruments) that may be spatially placed. The local audio data corresponding to a spatial representation may also be in MASA format, and may comprise background audio that may be music, nature sounds or any other ambient audio. When the audio previews are provided, one or more combinations of the local audio data may be provided, such that the rendered audio data may be modified according to the selected audio mode which is being previewed.

If the call has been answered, at operation 115, the audio may be rendered such that the rendered audio comprises incoming audio related to the incoming call. The incoming audio may comprise the audio sent from the transmitting user device. The incoming audio may be rendered as audio previews based on one or more selected audio modes, or may be rendered as audio for a finalized selected audio mode, such that the finalized selected audio mode may be a preferred audio mode of the receiving user 13.

Figure 12:
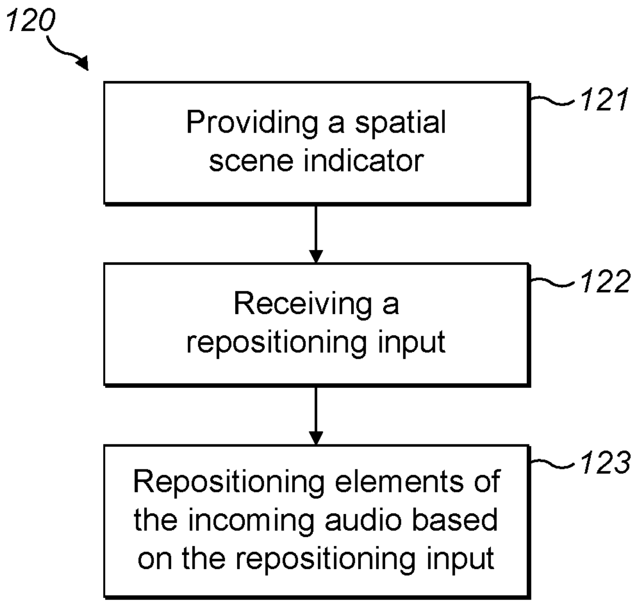

FIG. 12 is a flowchart of an algorithm, indicated generally by the reference numeral 120, in accordance with an example embodiment. At operation 121, a spatial scene indicator may be provided to the user, for example, dependent on the selected audio mode. For example, the spatial scene indicator may provide a representation of the spatial scenes corresponding to the selected audio mode, as described in further details with reference to FIGS. 13 to 17. At operation 122, a repositioning input may be received via the spatial scene indicator. The repositioning input may allow repositioning of one or more elements of the incoming audio, for example, relative to a virtual position of the receiving user 13 in the spatial scene. At operation 123, one or more elements of the incoming audio may be repositioned based on the received repositioning input.

For example, the preview can be related not only to different audio modes (e.g. spatial dimensions or levels of immersion), but may further be related to alternative constellations of audio sources. For example, the incoming audio may be related to a telephone conference (telco) with multiple participants. The telco experience may be optimized for a receiving user, and/or resource allocation for the telco may be optimized using one or more spatial scene indicators and/or repositioning inputs. For example, a receiving user may be listening to a multi-user telco while multitasking. The receiving user may be interested in comments made by only a certain user or users. The receiving user may thus wish to preview constellations where the direction(s) of the user(s) of interest make it easier to focus on the audio from the user(s) of interest.

Figure 13:
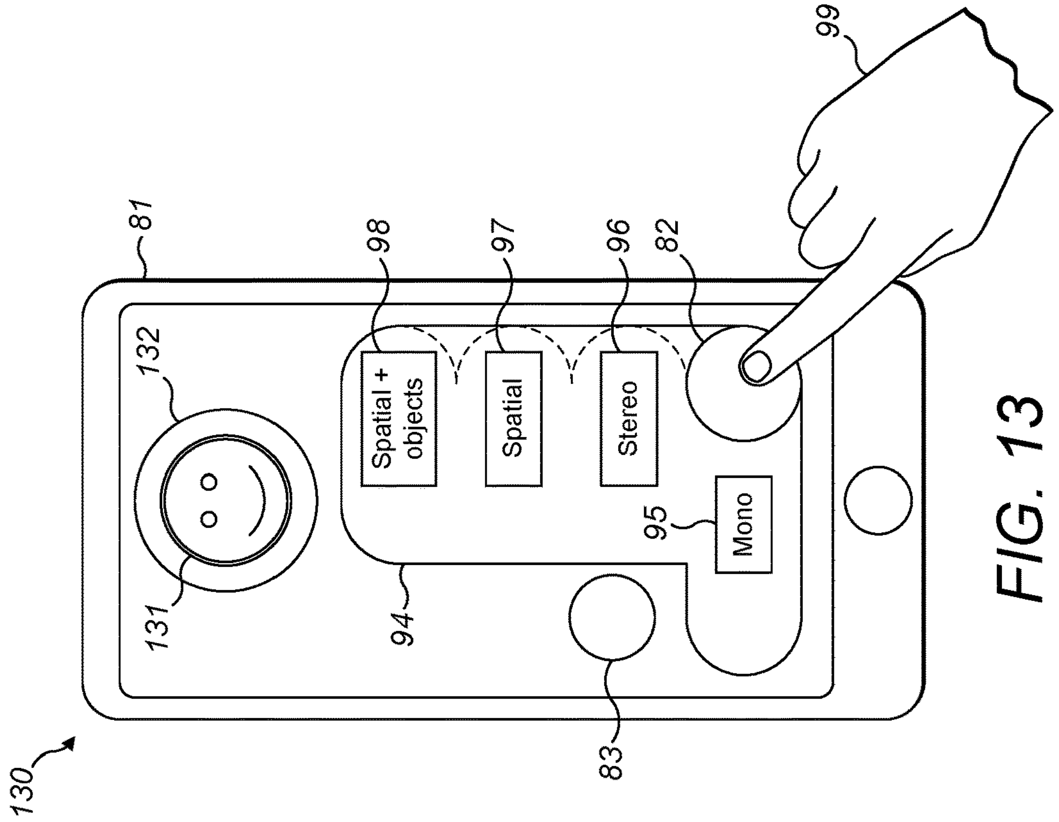

FIG. 13 is a block diagram of a system, indicated generally by the reference numeral 130, in accordance with an example embodiment. The system 130 comprises the user device 81, the accept element 82, the decline element 83, the audio mode selection element 94, the representations of the plurality of audio modes 95 to 98, and the touch input 99, as described above with reference to FIG. 9. In the system 130, the mono mode 95 is selected, for example, by dragging the accept element 82 in line with the mono mode 95 (e.g. the user may be previewing the mono mode). The system 130 further comprises a virtual user representation 131 and a spatial scene indicator 132. For example, the virtual user representation 131 may indicate the position of the call participant in the telco from whom the audio is being received, and the spatial scene indicator 132 may indicate graphically the spatial scene in different representations and the call participant arrangement (object constellation), including possible rearrangement options. As the mono mode may only provide single channel audio, audio from a plurality of sources (e.g. a current speaker in the telco, and any possible background noise) may be combined in a single channel, such that different audio sources may not be spatially distinct. Therefore, system 130 shows the virtual user representation 131 to be aligned with the spatial scene indicator 132, such that there may be no possible repositioning of the call participant.

Figure 14:
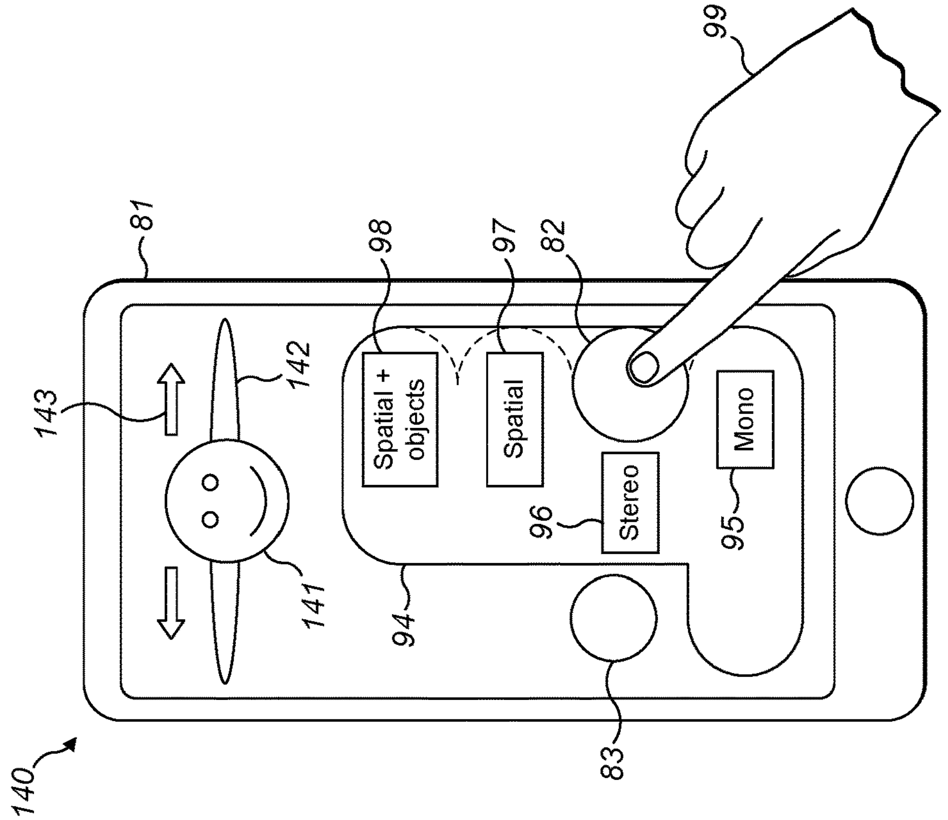
FIGS. 13 to 17 are block diagrams of systems in accordance with example embodiments.

FIG. 14 is a block diagram of a system, indicated generally by the reference numeral 140, in accordance with an example embodiment. The system 140 comprises the user device 81, the accept element 82, the decline element 83, the audio mode selection element 94, the representations of the plurality of audio modes 95 to 98, and the touch input 99, as described above with reference to FIG. 9. In the system 140, the stereo mode 96 is selected. The system 140 further comprises a virtual user representation 141 (similar to 131), a spatial scene indicator 142, and one or more repositioning indicators 143. The repositioning indicators 143 may indicate possible rearrangement options. In a stereo mode, the spatial scene may span from left to right, for example, in a horizontal plane. A default position of the call participant, as indicated by the virtual user representation 141, may be in a middle position. The user may interact with the virtual user representation 141 and/or the repositioning indicators 143 for repositioning one or more elements of the incoming audio. For example, the touch input 99 may be used to turn the head of the virtual user representation 141 to the right direction or the left direction to render the audio accordingly. Alternatively, or in addition, the touch input 99 may be used on the repositioning indicators 143 for moving the virtual user representation 141 towards the right (e.g. for focusing more on audio sources in the right) or towards the left (e.g. for focusing more on audio sources in the left).

Figure 15:
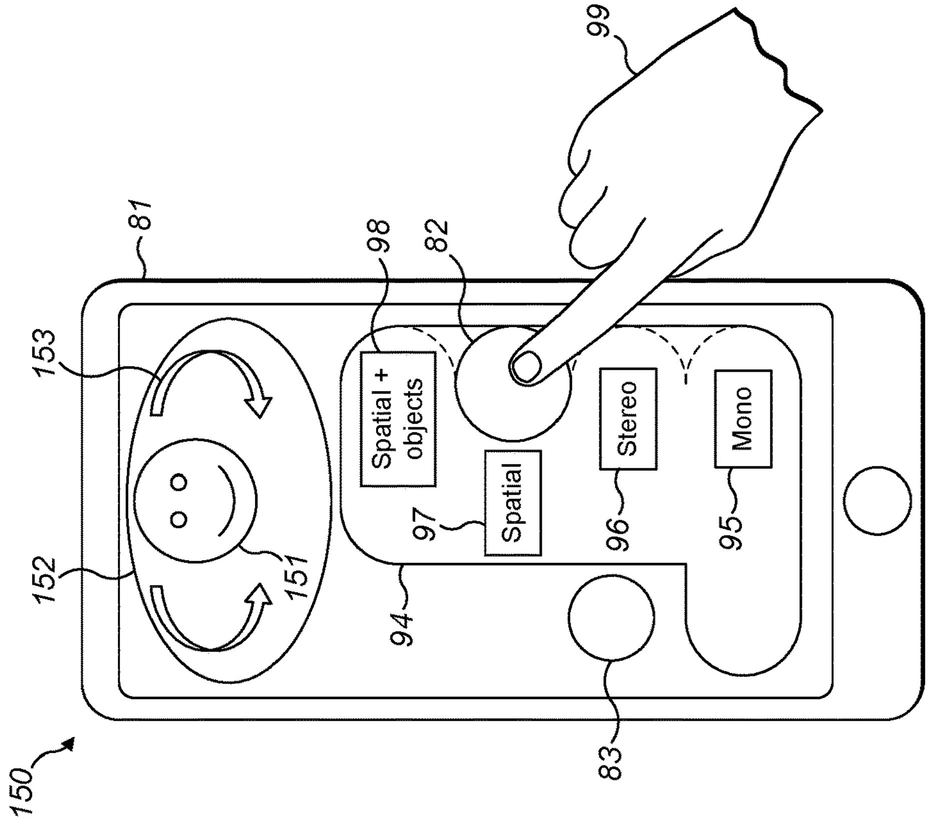

FIG. 15 is a block diagram of a system, indicated generally by the reference numeral 150, in accordance with an example embodiment. System 150 comprises the user device 81, the accept element 82, the decline element 83, the audio mode selection element 94, the representations of the plurality of audio modes 95 to 98, and the touch input 99, as described above with reference to FIG. 9. In system 150, the spatial audio mode 97 is selected. System 150 further comprises a virtual user representation 151 (similar to representations 131 and 141), a spatial scene indicator 152, and one or more repositioning indicators 153. The repositioning indicators 153 may indicate possible rearrangement options. In a spatial audio mode, the spatial scene may spherically surround the call participant, for example, in both the horizontal plane and vertical planes. A default position of the call participant, as indicated by the virtual user representation 151, may be in a centre position. The user may interact with the virtual user representation 151 and/or the repositioning indicators 153 for repositioning one or more elements of the incoming audio. For example, the touch input 99 may be used to turn the head of the virtual user representation 151 in any direction (clockwise or anticlockwise) to render the audio accordingly. Alternatively, or in addition, the touch input 99 may be used on the repositioning indicators 153 for moving the virtual user representation 151 nearer to the edge of the spatial scene indicator in any direction, for example, for focusing more on audio sources in that direction (e.g. repositioned to different orientations around the listener via rotation of the entire spatial audio scene).

Figure 16:
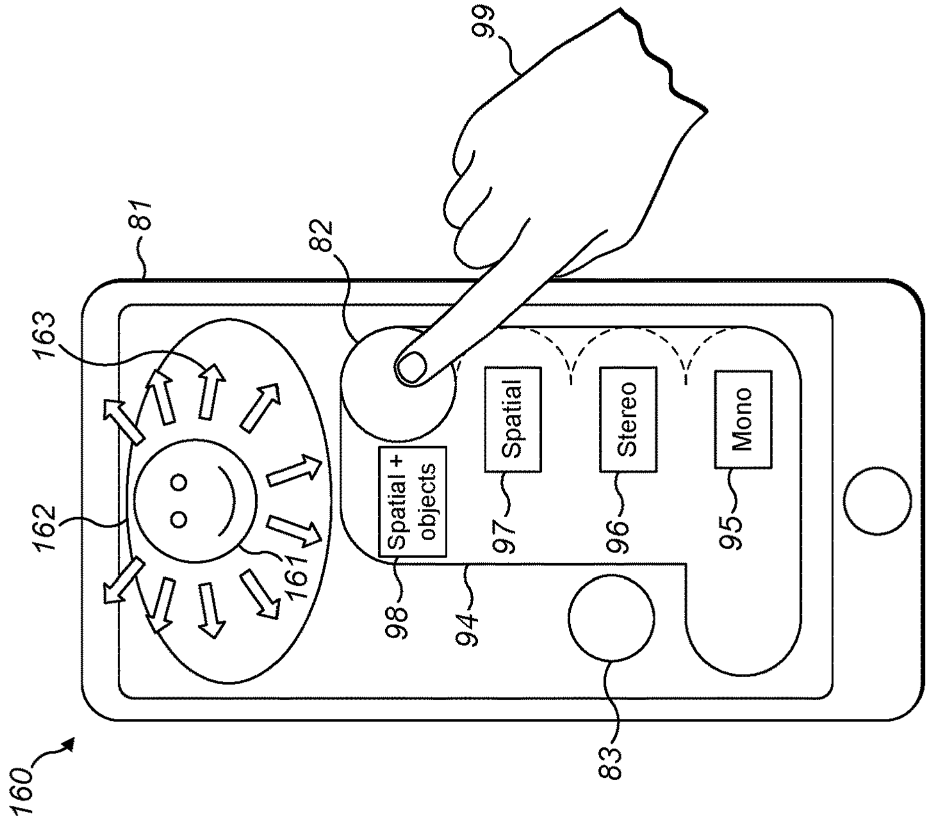

FIG. 16 is a block diagram of a system, indicated generally by the reference numeral 160, in accordance with an example embodiment. System 160 comprises the user device 81, the accept element 82, the decline element 83, the audio mode selection element 94, the representations of the plurality of audio modes 95 to 98, and the touch input 99, as described above with reference to FIG. 9. In system 160, the spatial audio with objects mode 98 is selected. System 160 further comprises a virtual user representation 161 (similar to representations 131, 141 and 151), a spatial scene indicator 162, and one or more repositioning indicators 163. The repositioning indicators 163 may indicate possible rearrangement options. In a spatial audio with objects mode, the spatial scene may spherically surround the call participant, for example, in both the horizontal plane and vertical planes, and one or more audio sources (objects) may be repositioned. A default position of the call participant, as indicated by the virtual user representation 161, may be in a centre position. Similar to the system 150, the user may interact with the virtual user representation 161 and/or the repositioning indicators 163 for repositioning one or more elements of the incoming audio. The user may further interact with the repositioning indicators 163 for moving nearer to one or more objects of interest, such that the audio from the one or more objects of interest is more focused (e.g. made louder compared to audio from other audio sources).

In addition to the conversational use cases discussed herein, such as calls or telephone conferences, the example embodiments may also be used also in media streaming (e.g. videos, virtual reality, augmented reality, games, etc.).

Figure 17:
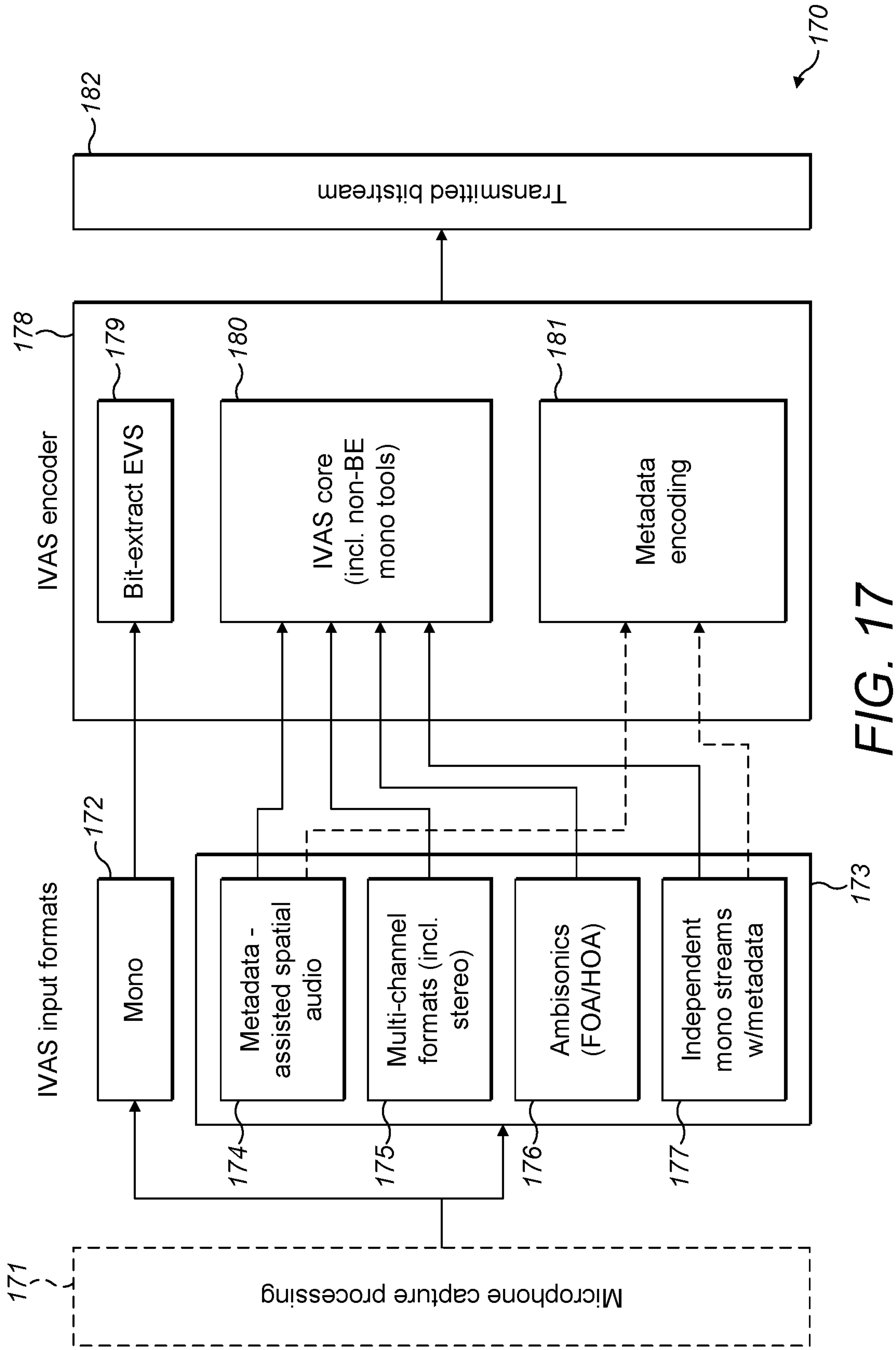

FIG. 17 is a block diagram of a system, indicated generally by the reference numeral 170, in accordance with an example embodiment. The system 170 shows audio communication compression from a transmitting user (such as the transmitting user 11) to a receiving user (such as the user 13). The system 170 comprises an audio capture module 171 (such as a microphone capture processing module) for capturing audio on a transmitter side. The captured audio may be formatted into one or more IVAS input formats including a mono format 172, and a non-mono format 173. The spatial or non-mono format 173 may comprise one or more of the MASA format 174, multi-channel formats 175 (including stereo format), ambisonics format 176 (FOA/HOA) and/or a format 177 for independent mono streams with metadata (i.e., audio objects). The formatted audio may be encoded in the IVAS encoder 178, where mono audio formats may be encoded using EVS encoding 179, non-mono audio formats may be encoded using IVAS core encoding 180, and metadata related to the metadata based audio formats (such as MASA format 174 and/or format 177) may be encoded using the metadata encoding 181. The encoded audio may then be transmitted in a bitstream 182 to a user device used by a receiving user (such as the receiving user 13 described above).

Metadata-assisted spatial audio (MASA) is a parametric spatial audio format and representation. At high level, MASA can be considered a representation consisting of 'N channels+spatial metadata'. It is a scene-based audio format particularly suited for spatial audio capture on practical devices, such as smartphones. The sound scene may be described in terms of time- and frequency-varying sound source directions. Where no directional sound source is detected, the audio may be described as diffuse. In MASA, there may be, for example, one or two directions for each time-frequency (TF) tile.

Figure 18:
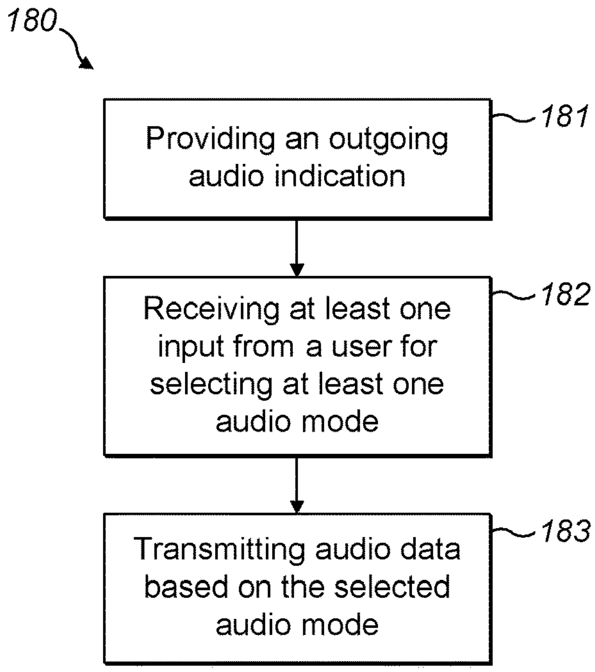
FIG. 18 is a flowchart of an algorithm in accordance with an example embodiment.

FIG. 18 is a flowchart of an algorithm, indicated generally by the reference numeral 180, in accordance with an example embodiment. The operations of the algorithm 180 may be performed at a transmitting side, for example, at a transmitting user device used by the transmitting user 11. At operation 181, when the transmitting user 11 wishes to send audio or call one or more receiving users, an outgoing audio indication may be provided to the transmitting user, such that the outgoing audio indication may comprise representations of a plurality of audio modes. At operation 182, at least one input may be received from the transmitting user 11 for selecting at least one of the plurality of audio modes. For example, the transmitting user 11 may wish to preview one or more audio modes, or select one or more audio modes for transmitting to the receiving user(s). At operation 183, the transmitting device may transmit audio data based, at least partially, on the selected audio mode. For example, one or more parameters of the transmitted audio may be determined based on the selected at least one of the plurality of audio modes.

In one example, one or more inputs received at operation 182 may render a preview of the audio mode selected for previewing. The transmitting user may, for example, preview all audio modes (e.g. mono, stereo, spatial, spatial objects), and then select one or more audio modes for transmission to the receiving device. For example, if the transmitting user selects the spatial objects mode (e.g. the highest spatial dimension), the other lower spatial dimension audio modes, such as the mono, stereo, and spatial modes may also be made available to the receiving user. Alternatively, or in addition, if the transmitting user selects a lower spatial dimension audio mode, such as the mono or stereo mode, the audio modes with higher spatial dimensions (e.g. spatial mode, spatial objects mode) may not be made available to the receiving user, for example, by only transmitting audio data relating to mono and/or stereo audio modes.

In another example, the audio modes available for selection to the transmitting user may, at least partially, be dependent on the network capabilities of the transmitting device, and/or the hardware capabilities of the transmitting device. For example, the transmitting device may not be able to select audio modes of higher spatial dimensions for transmitting the audio data to the receiving device in the event that the transmitting device has low network capabilities (e.g. poor network connection), insufficient hardware capabilities (e.g. absence of equipment for capturing spatial audio), or low processing resources. In one example, even if the transmitting device has low network, hardware, or processing capabilities, the transmitting device may be able to preview audio modes relating to higher spatial dimensions (e.g. spatial mode or spatial objects mode).

As described above, in some examples, the audio modes available for selection by the receiving user may be dependent upon various factors, including preferences of a transmitting user of the incoming audio (e.g. preferences based on the received inputs at operation 182); network capabilities of a transmitter of the incoming audio; network capabilities of the receiver of the incoming audio; and/or a level of audio present in the incoming audio. For example, the audio mode selection element (54) displayed to the receiving user may only comprise representations for audio modes that are available for selection by the user.

In one example, the input from the transmitting user at operation 182 may be received before the transmitter has sent the audio indication (e.g. initiated the call) and/or after the caller has initiated the call and is then waiting for the other person to answer. In one example, the user interface provided to the transmitting user at the transmitting device for previewing and/or selecting an audio mode for the outgoing audio may be similar to the user interface (e.g. as shown in FIGS. 5, 6, 8, 9, 13, 14, 15, and/or 16) provided to the receiving user for the incoming call.

Figure 19:
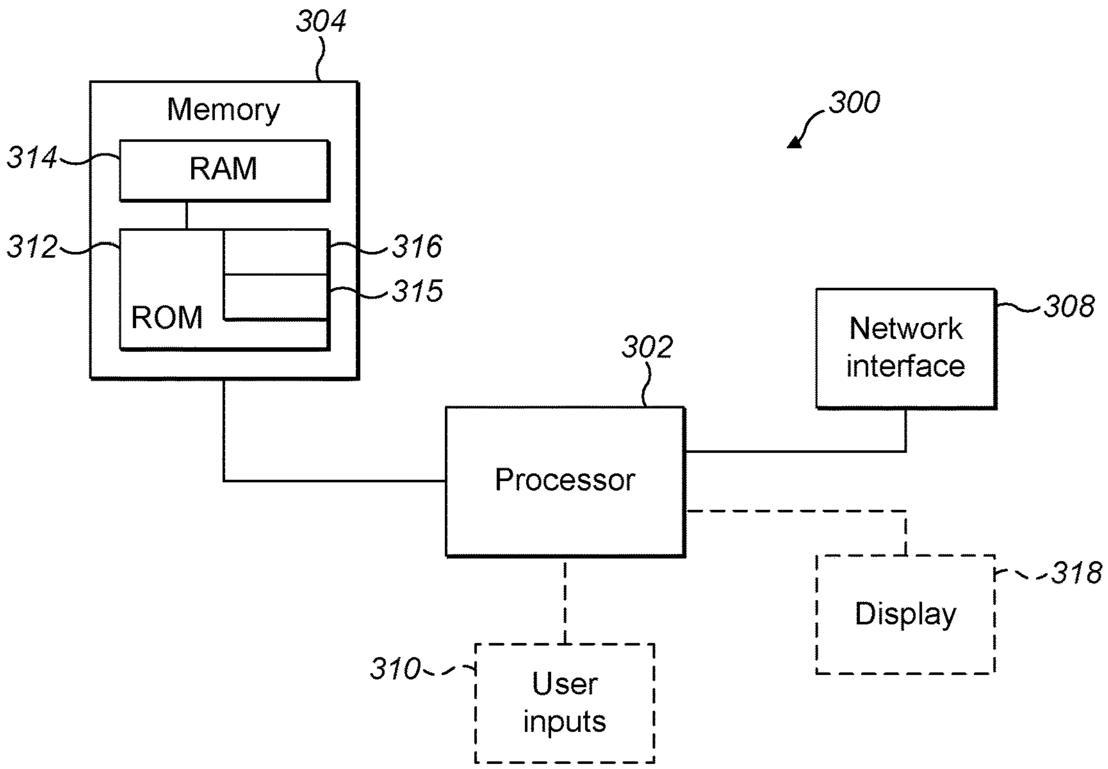
FIG. 19 is a block diagram of components of a system in accordance with an example embodiment.

For completeness, FIG. 19 is a schematic diagram of components of one or more of the example embodiments described previously, which hereafter are referred to generically as a processing system 300. The processing system 300 may, for example, be the apparatus referred to in the claims below.

The processing system 300 may comprise one or more of: a processor 302, a memory 304 closely coupled to the processor and comprised of a RAM 314 and a ROM 312, a user input 310 (such as a touch screen input, hardware keys and/or a voice input mechanism) and a display 318 (at least some of those components may be omitted in some example embodiments). The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 100, 110, 120 and 180 described above. Note that in the case of small device/apparatus the memory can be most suitable for small size usage i.e. not always a hard disk drive (HDD) or a solid state drive (SSD) is used. The memory 304 may include computer program code, such that the at least one memory 304 and the computer program may be configured, with the at least one processor 302, may cause the performance of the apparatus.

An apparatus, as described in the above example embodiments (e.g. user device 51, 81), may comprise means (e.g. processor 302 of FIG. 18) for performance of operations of FIGS. 4, 10, 11, 12 and 18.

Processor 302 may comprise means, such as circuitry, for implementing audio, video, communication, navigation, logic functions, and/or the like, as well as for implementing embodiments of the invention including, for example, one or more of the functions described herein. For example, processor 302 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the apparatus (e.g. user device 51, 81) among these devices according to their respective capabilities.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 20A:
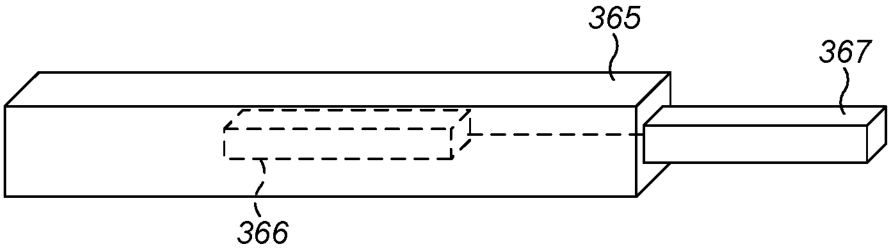
FIGS. 20A and 20B show tangible media, respectively a removable non-volatile memory unit and a Compact Disc (CD) storing computer-readable code which when run by a computer perform operations according to example embodiments.
Figure 20B:
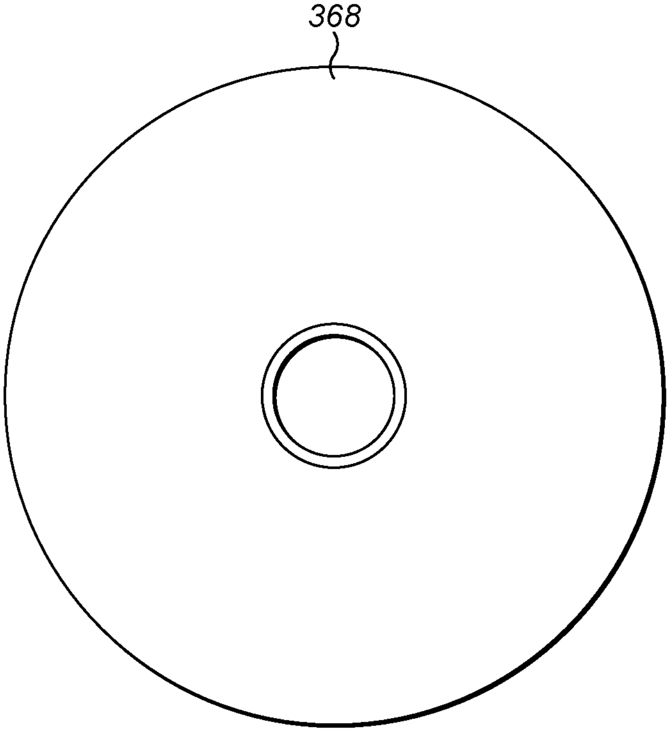

FIGS. 20A and 20B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 10, 11, 12 and 18 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; at least one memory storing instructions that, when executed by the at least one processor, cause the apparatus at least to:

provide an incoming audio indication in response to incoming audio, the incoming audio indication comprising one or more representations of a plurality of audio modes;

receive at least one input from a user for selecting one of the plurality of audio modes; and render audio based, at least partially, on the selected audio mode, wherein one or more parameters of the rendered audio are determined based on the selected audio mode.

2. An apparatus as claimed in claim 1, wherein the one or more representations comprise one or more visual representations.

3. An apparatus as claimed in claim 1, wherein the rendered audio comprises an audio preview of the selected audio mode.

4. An apparatus as claimed in claim 1, wherein:
the incoming audio comprises one or more audio components; and
the rendered audio comprises one or more of the audio components of the incoming audio, wherein the one or more audio components of the rendered audio are dependent, at least in part, on the selected audio mode.

5. An apparatus as claimed in claim 1, further configured to:
determine whether one or more audio components of the incoming audio are active or inactive; and in the event that one or more audio components of the incoming audio related to the selected audio mode are inactive, use one or more components of obtained local audio data for rendering the audio, wherein the one or more components of obtained local audio data correspond to the one or more inactive audio components.

6. An apparatus as claimed in claim 5, further configured to: obtain local audio data corresponding to at least one of the plurality of audio modes.

7. An apparatus as claimed in claim 1, wherein the incoming audio relates to an incoming call.

8. An apparatus as claimed in claim 5, wherein:
the incoming audio relates to an incoming call;
the rendered audio comprises incoming audio related to the incoming call in the event that the incoming call is answered; and
the rendered audio comprises the local audio data in the event that the incoming call is not answered.

9. An apparatus as claimed in claim 1, wherein the audio modes comprise at least some of a mono mode, a stereo mode, a spatial mode, or a spatial object mode.

10. An apparatus as claimed in claim 1, wherein the one or more representations of the plurality of audio modes is dependent on an availability of one or more of said audio modes.

11. An apparatus as claimed in claim 10, wherein the availability of one or more audio modes is dependent on one or more of: preferences of a transmitting user of the incoming audio; network capabilities of a transmitter of the incoming audio; network capabilities of the receiver of the incoming audio; or a level of audio present in the incoming audio.

12. An apparatus as claimed in claim 1, further configured to:
provide a spatial scene indicator, wherein the spatial scene indicator is dependent on the selected audio mode.

13. An apparatus as claimed in claim 12, further configured to:
receive a repositioning input via the spatial scene indicator, wherein the repositioning input allows repositioning of one or more elements of the incoming audio.

14. A method comprising:
providing an incoming audio indication in response to incoming audio, the incoming audio indication comprising one or more representations of a plurality of audio modes;
receiving at least one input from a user for selecting one of the plurality of audio modes; and
rendering audio based, at least partially, on the selected audio mode, wherein one or more parameters of the rendered audio are determined based on the selected audio mode.

15. A method as claimed in claim 14, wherein the one or more representations comprise one or more visual representations.

16. A method as claimed in claim 14, wherein the rendered audio comprises an audio preview of the selected audio mode.

17. A method as claimed in claim 14, wherein the incoming audio comprises one or more audio components; and
the rendered audio comprises one or more of the audio components of the incoming audio, wherein the one or more audio components of the rendered audio are dependent, at least in part, on the selected audio mode.

18. A method as claimed in claim 14 further comprising:
determining whether one or more audio components of the incoming audio are active or inactive; and
in the event that one or more audio components of the incoming audio related to the selected audio mode are inactive, using one or more components of obtained local audio data for rendering the audio, wherein the one or more components of obtained local audio data correspond to the one or more inactive audio components.

19. A method as claimed in claim 18 further comprising:
obtaining local audio data corresponding to at least one of the plurality of audio modes.

20. A non-transitory computer readable medium comprising instructions for causing an apparatus to perform at least the following:
providing an incoming audio indication in response to incoming audio, the incoming audio indication comprising one or more representations of a plurality of audio modes;
receiving at least one input from a user for selecting one of the plurality of audio modes; and
rendering audio based, at least partially, on the selected audio mode, wherein one or more parameters of the rendered audio are determined based on the selected audio mode.

* * * * *